United States Patent
Sharman

(10) Patent No.: US 9,706,230 B2
(45) Date of Patent: Jul. 11, 2017

(54) DATA ENCODING AND DECODING

(71) Applicant: Sony Corporation, Tokyo (JP)

(72) Inventor: Karl James Sharman, Newbury (GB)

(73) Assignee: SONY CORPORATION, Tokyo (JP)

( * ) Notice: Subject to any disclaimer, the term of this patent is extended or adjusted under 35 U.S.C. 154(b) by 87 days.

(21) Appl. No.: 14/807,283

(22) Filed: Jul. 23, 2015

(65) Prior Publication Data

US 2016/0142740 A1   May 19, 2016

(30) Foreign Application Priority Data

Nov. 17, 2014  (GB) .................................. 1420381.4

(51) Int. Cl.
| | |
|---|---|
| *H04B 1/00* | (2006.01) |
| *H04N 19/91* | (2014.01) |
| *H04N 19/96* | (2014.01) |
| *H04N 19/169* | (2014.01) |

(52) U.S. Cl.
CPC ......... *H04N 19/91* (2014.11); *H04N 19/1883* (2014.11); *H04N 19/96* (2014.11)

(58) Field of Classification Search
CPC ..... H04N 19/91; H04N 19/1883; H04N 19/96
See application file for complete search history.

(56) References Cited

U.S. PATENT DOCUMENTS

| | | | |
|---|---|---|---|
| 2013/0279817 A1 | 10/2013 | Wan et al. | |
| 2013/0301705 A1* | 11/2013 | Seregin ................ | H04N 19/129 375/240.02 |
| 2014/0286417 A1 | 9/2014 | Gamei et al. | |

(Continued)

FOREIGN PATENT DOCUMENTS

WO   WO 2014/005087 A2   1/2014

OTHER PUBLICATIONS

U.S. Appl. No. 14/315,498, filed Jun. 26, 2014, James Alexander Gamei et al.

(Continued)

*Primary Examiner* — Tat Chio

(74) *Attorney, Agent, or Firm* — Oblon, McClelland, Maier & Neustadt, L.L.P.

(57) ABSTRACT

A video encoding method comprises partitioning each image of a video signal into an array of coding tree units; partitioning the array of coding tree units of each image into a portion pattern of rectangular portions for independent encoding such that the prediction dependencies of samples within a portion do not extend into any other portion and the entropy encoding parameters of one portion are independent of those of any other portion, the portion pattern being such that each row of coding tree units is partitioned into at least two of the portions; encoding the coding tree units within each portion using wavefront parallel processing in which, for each portion, successive rows of coding tree units within the portion are encoded so that encoding dependencies are not broken at row boundaries and encoding parameters are propagated from an intermediate position along each row to the start of the next row of coding tree units; and outputting the encoded coding tree units according to an order with respect to the array of coding tree units which is different to a raster order of coding tree units within successive respective portions.

15 Claims, 19 Drawing Sheets

(56) References Cited

U.S. PATENT DOCUMENTS

| | | |
|---|---|---|
| 2014/0307807 A1 | 10/2014 | Gamei et al. |
| 2015/0023406 A1* | 1/2015 | Lee ................ H04N 19/46 375/240.02 |
| 2015/0043641 A1 | 2/2015 | Gamei et al. |
| 2015/0063457 A1 | 3/2015 | Gamei et al. |
| 2015/0063460 A1 | 3/2015 | Gamei et al. |
| 2015/0078447 A1 | 3/2015 | Gamei et al. |
| 2015/0085924 A1 | 3/2015 | Gamei et al. |
| 2015/0117527 A1 | 4/2015 | Gamei et al. |
| 2015/0172652 A1 | 6/2015 | Gamei et al. |
| 2015/0304667 A1* | 10/2015 | Suehring ............ H04N 19/70 375/240.02 |
| 2016/0261878 A1* | 9/2016 | Deshpande ......... H04N 19/70 |

OTHER PUBLICATIONS

Chi Ching Chi et al. "Parallel Scalability and Efficiency of HEVC Parallelization Approaches", IEEE Transactions on Circuits and Systems for Video Technology, vol. 22, No. 12, Dec. 2012, 12 pages.

* cited by examiner

| 0 | 1 | 2 | 3 | 4 | 5 | 6 | 7 | 8 | 9 | 10 | 11 |
|---|---|---|---|---|---|---|---|---|---|---|---|
| 12 | 13 | 14 | 15 | 16 | 17 | 18 | 19 | 20 | 21 | 22 | 23 |
| 24 | 25 | 26 | 27 | 28 | 29 | 30 | 31 | 32 | 33 | 34 | 35 |
| 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 |
| 72 | 73 | 74 | 75 | 76 | 77 | 78 | 79 | 80 | 81 | 82 | 83 |

| 0 | 1 | 2 | 3 | 20 | 21 | 22 | 23 | 40 | 41 | 42 | 43 |
|---|---|---|---|----|----|----|----|----|----|----|----|
| 4 | 5 | 6 | 7 | 24 | 25 | 26 | 27 | 44 | 45 | 46 | 47 |
| 8 | 9 | 10 | 11 | 28 | 29 | 30 | 31 | 48 | 49 | 50 | 51 |
| 12 | 13 | 14 | 15 | 32 | 33 | 34 | 35 | 52 | 53 | 54 | 55 |
| 16 | 17 | 18 | 19 | 36 | 37 | 38 | 39 | 56 | 57 | 58 | 59 |
| 60 | 61 | 62 | 63 | 68 | 69 | 70 | 71 | 76 | 77 | 78 | 79 |
| 64 | 65 | 66 | 67 | 72 | 73 | 74 | 75 | 80 | 81 | 82 | 83 |

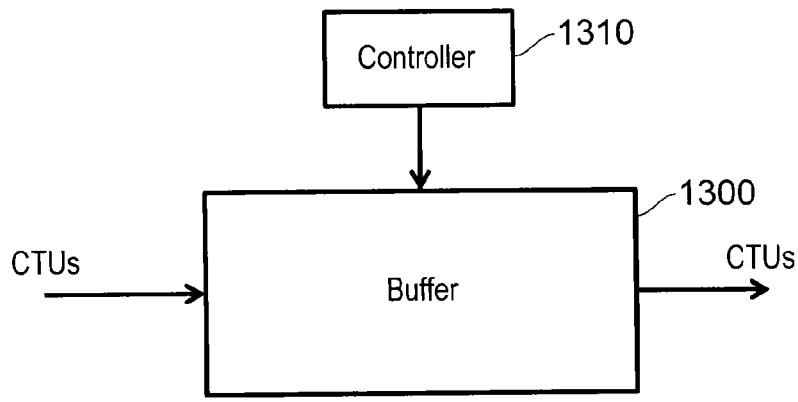
FIG. 26
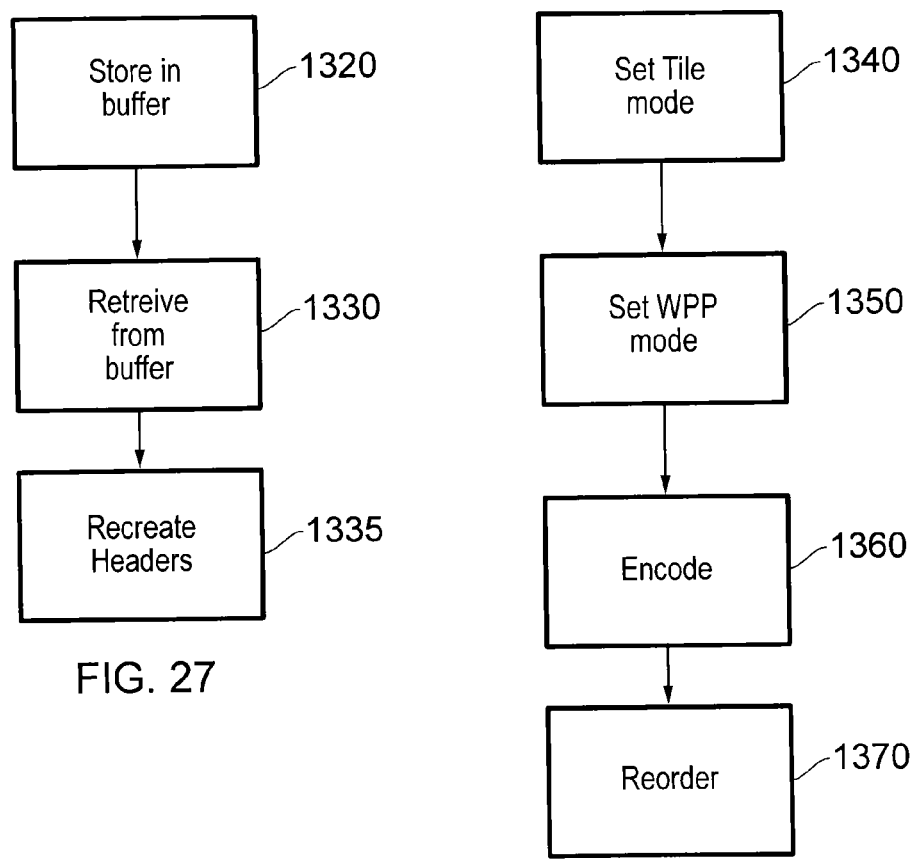
FIG. 27
FIG. 28

DATA ENCODING AND DECODING

CROSS REFERENCE TO RELATED APPLICATIONS

The present application claims priority to United Kingdom application GB1420381.4 filed on 17 Nov. 2014, the contents of which being incorporated herein by reference in its entirety.

FIELD OF THE DISCLOSURE

This disclosure relates to data encoding and decoding.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

There are several video data compression and decompression systems which involve transforming video data into a frequency domain representation, quantising the frequency domain coefficients and then applying some form of entropy encoding to the quantised coefficients.

Various features are provided by video encoding and decoding systems to allow for parallel operation, for example parallel operation at the decoder. In order to achieve parallel operation without undesirable levels of latency, an image must be divided into portions such that each portion can be decoded independently of other such portions. But the manner in which this division is achieved can have significant effects on the coding efficiency (a term used here to indicate how well an image of a particular image quality (as recovered after decoding) can be represented by a datastream; a higher coding efficiency indicates that, for a particular image quality, a lower number of data bits are needed to represent the image) as well as the decoder latency and buffering requirements.

SUMMARY

This disclosure provides a video encoding method comprising:

partitioning each image of a video signal into an array of coding tree units;

partitioning the array of coding tree units of each image into a portion pattern of rectangular portions for independent encoding such that the prediction dependencies of samples within a portion do not extend into any other portion and the entropy encoding parameters of one portion are independent of those of any other portion, the portion pattern being such that each row of coding tree units is partitioned into at least two of the portions;

encoding the coding tree units within each portion using wavefront parallel processing in which, for each portion, successive rows of coding tree units within the portion are encoded so that encoding dependencies are not broken at row boundaries and encoding parameters are propagated from an intermediate position along each row of the portion to the start of the next row of coding tree units; and outputting the encoded coding tree units according to an order with respect to the array of coding tree units which is different to a raster order of coding tree units within successive respective portions.

Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein:

FIG. 26 schematically illustrates a data reordering arrangement;

FIG. 27 is a schematic flowchart illustrating operations of the arrangement of FIG. 26;

FIG. 28 is a schematic chart illustrating operations of the apparatus of FIG. 5; and FIGS. 29A and 29B schematically illustrate encoding orders in respect of a 4K image.

DESCRIPTION OF THE EMBODIMENTS

Figure 1:
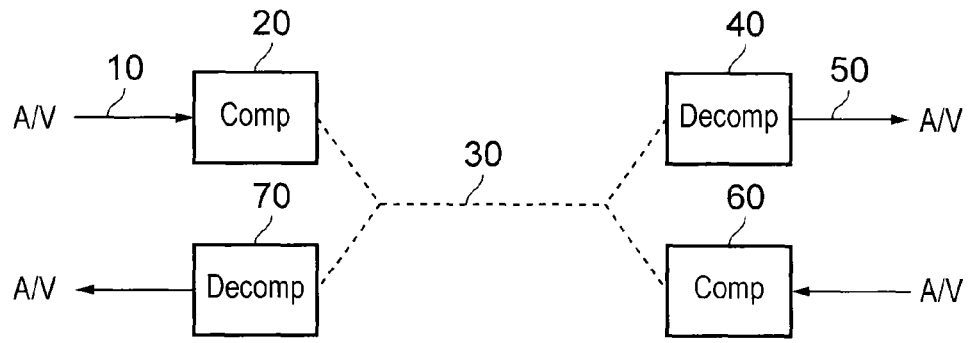
FIG. 1 schematically illustrates an audio/video (A/V) data transmission and reception system using video data compression and decompression.

Referring now to the drawings, FIGS. 1-4E are provided to give schematic illustrations of apparatus or systems making use of the compression and/or decompression apparatus to be described below in connection with embodiments.

All of the data compression and/or decompression apparatus is to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is uni-directional, only one of the nodes would require a compression apparatus and the other node would only require a decompression apparatus.

Figure 2:
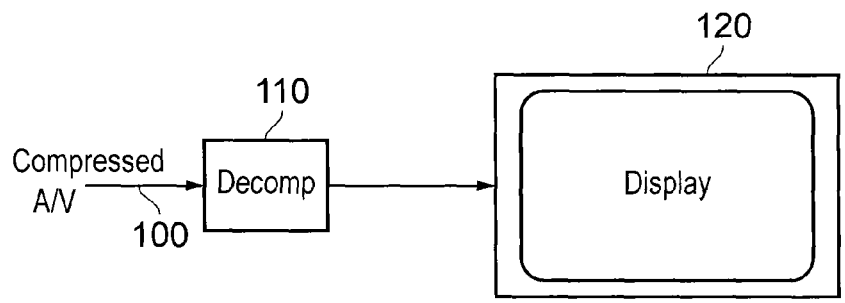
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 might be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
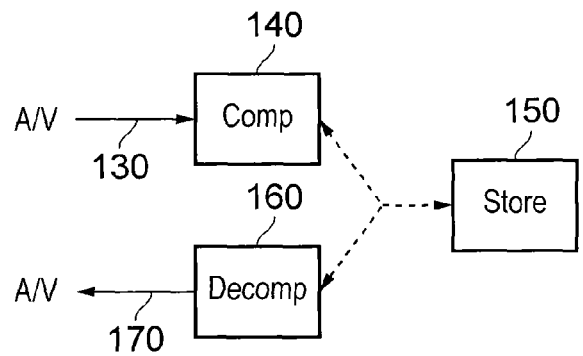
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium or data carrier storing that signal, are considered as embodiments. Reference is made to FIGS. 4D and 4E described below.

Figure 4A:
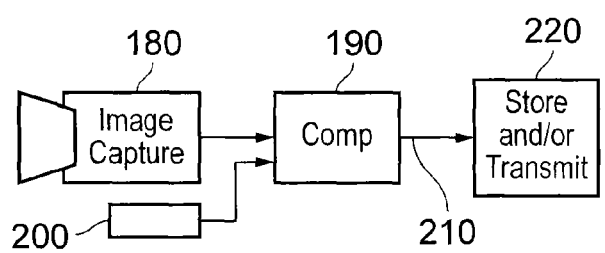
FIG. 4A schematically illustrates a video camera using video data compression.

FIG. 4A schematically illustrates a video camera using video data compression. In FIG. 4A, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4E) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 4B:
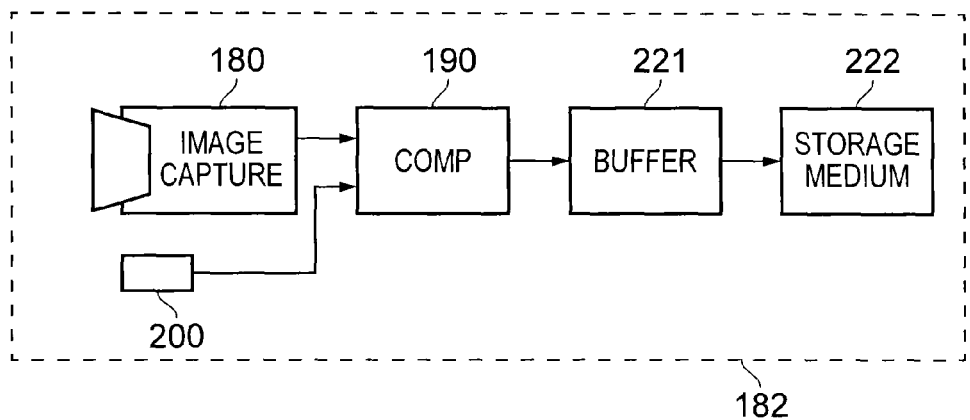
FIG. 4B schematically illustrates an example video camera in more detail.

FIG. 4B schematically illustrates an example video camera apparatus 183 in more detail. Those features numbered in common with FIG. 4A will not be described further. FIG. 4B is an example of the camera of FIG. 4A (in the case that the unit 220 of FIG. 4A provides a storage capability) in which the compressed data are first buffered by a buffer 221 and then stored in a storage medium 222 such as a magnetic disk, an optical disk, flash memory, a so-called solid-state disk drive (SSD) or the like. Note that the arrangement of FIG. 4B can be implemented as a single (physical) unit 182.

Figure 4C:
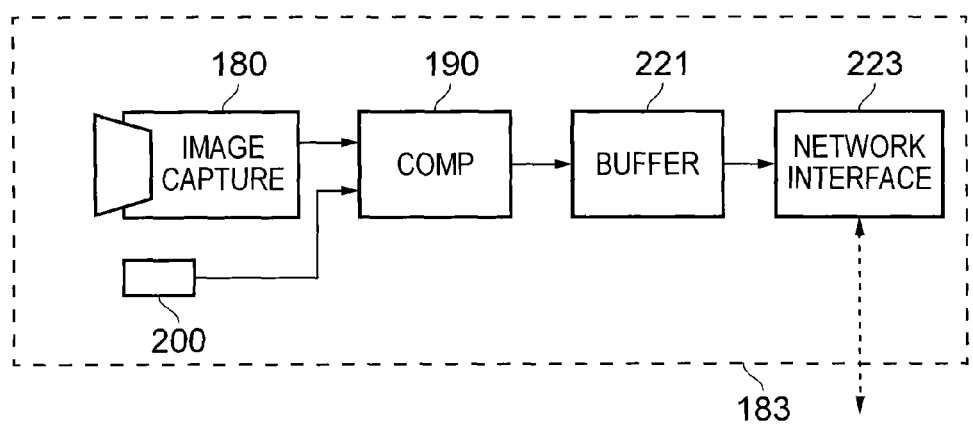
FIG. 4C schematically illustrates another example video camera.
Figure 4D:
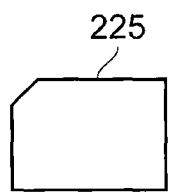
FIGS. 4D and 4E schematically illustrate data carriers.
Figure 4E:
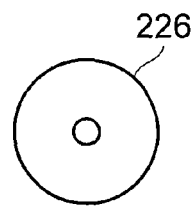

FIG. 4C schematically illustrates another example video camera in which, in place of the storage arrangement of FIG. 4B, a network interface 223 is provided in order to allow the compressed data to be transmitted to another unit (not shown). The network interface 223 can also allow for incoming data to be received by the video camera, such as control data. Note that the arrangement of FIG. 4b can be implemented as a single (physical) unit 183.

FIGS. 4D and 4E schematically illustrate data carriers, for example for use as the storage medium 222 and carrying compressed data which has been compressed according to the compression techniques described in the present application. FIG. 4D shows a schematic example of a removable non-volatile storage medium 225 implemented as solid state memory such as flash memory. FIG. 4E shows a schematic example of a removable non-volatile storage medium 226 implemented as a disk medium such as an optical disk.

Figure 5:
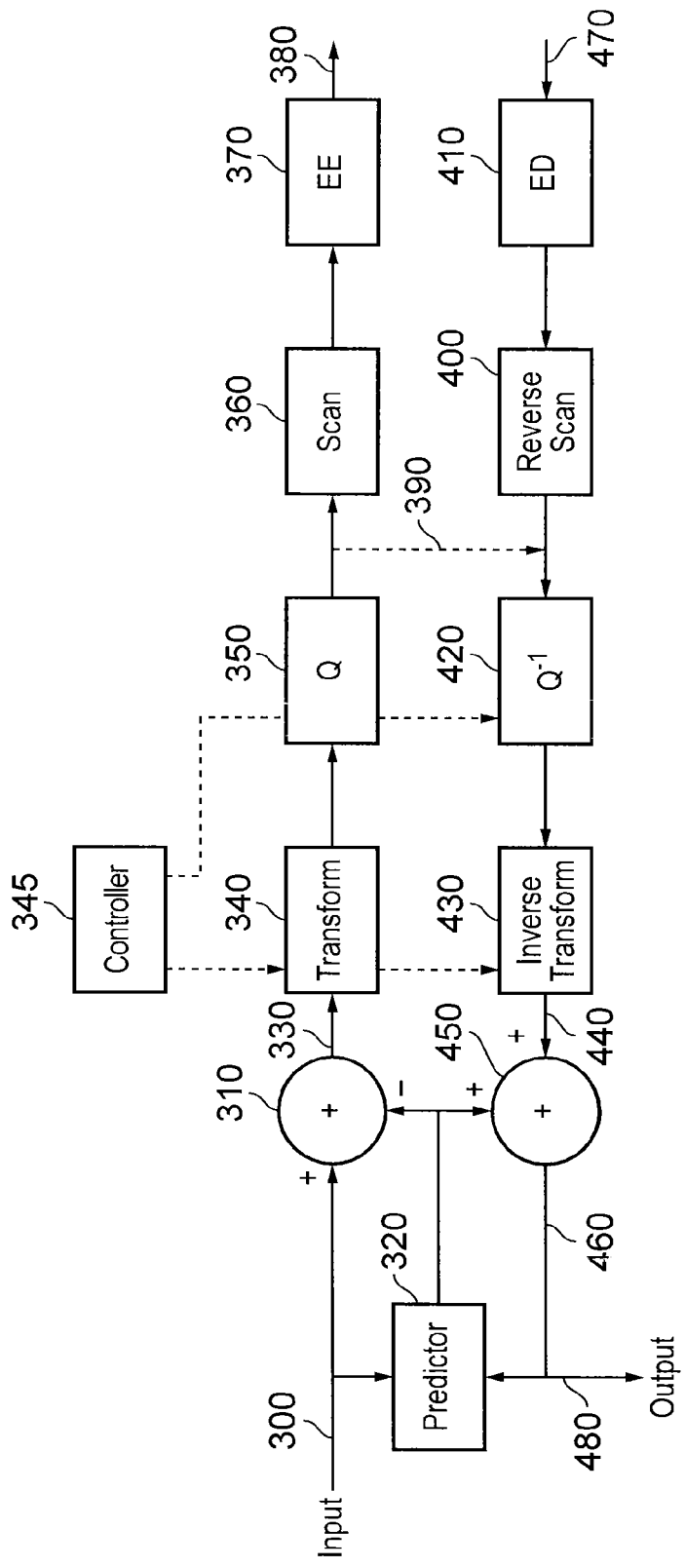
FIG. 5 provides a schematic overview of a video data compression and decompression apparatus.

FIG. 5 provides a schematic overview of a video data compression and decompression apparatus.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tends to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here. There are however aspects of the techniques used in the present apparatus which will be described in more detail below.

Note that in some embodiments, a discrete sine transform (DST) is used instead of a DCT. In other embodiments, no transform might be used. This can be done selectively, so that the transform stage is, in effect, bypassed, for example under the control of a "transform-skip" command or mode.

The output of the transform unit 340, which is to say, a set of transform coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process work more efficiently in generating small amounts of compressed video data.

A controller 345 controls the operation of the transform unit 340 and the quantiser 350 (and their respective inverse units), according to techniques to be discussed further below. Note that the controller 345 may also control other aspects of the operation of the apparatus of FIG. 5.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called zigzag scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC.

Note that the scanning process and the entropy encoding process are shown as separate processes, but in fact can be combined or treated together. That is to say, the reading of data into (or processing of data by) the entropy encoder can take place in the scan order. Corresponding considerations apply to the respective inverse processes.

The output of the entropy encoder 370, along with additional data, for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal corresponds to the return path of the compression process and so a decoding apparatus or method corresponds to the features or operation of the decoding path of the encoder described here.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320.

Turning now to the process applied to a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output.

Accordingly, FIG. 5 provides an example of video data decoding apparatus operable to decode an array of encoded video data values, the apparatus comprising: a dequantiser configured to dequantise the array of encoded video data values by applying a dequantisation parameter to each data value so as to generate corresponding dequantised data values; and an inverse frequency transformer configured to apply an inverse frequency transform to the dequantised data values. FIG. 5 also provides an example of video data encoding apparatus operable to encode an array of input video data values in a transform-skip mode and optionally a non transform-skip mode (discussed further below), the apparatus comprising: a frequency transformer configured to apply a frequency transform to the input video data values to generate an array of frequency transformed input data values; and a quantiser configured to quantise the frequency transformed input data values by applying a quantisation parameter to each frequency transformed input data value so as to generate corresponding quantised data values. Note that the term "optionally" is used to indicate that the apparatus may be operable in a transform-skip mode and a non-transform-skip mode, with the selection being made on a block by block (such as TU-by-TU) or other basis, or may be an apparatus which is not operable in the non-transform-skip mode.

Figure 6:
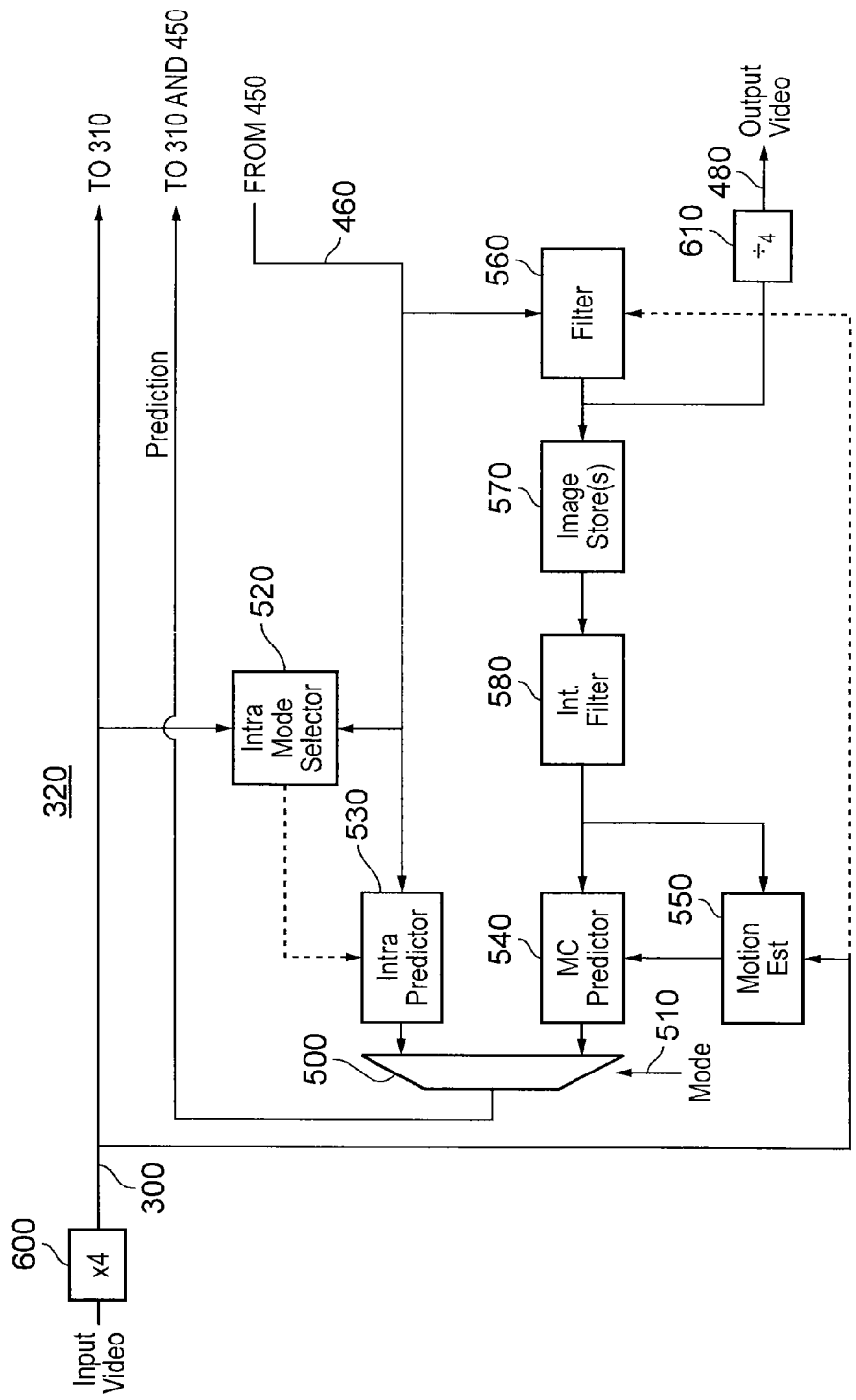
FIG. 6 schematically illustrates the generation of predicted images.

FIG. 6 schematically illustrates the generation of predicted images, and in particular the operation of the image predictor 320.

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments the choice is still made on an image-by-image basis.

Motion-compensated prediction makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output data stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

The processing applied to the signal 460 will now be described. Firstly, the signal is filtered by a filter unit 560. This involves applying a "deblocking" filter to remove or at least tend to reduce the effects of the block-based processing carried out by the transform unit 340 and subsequent operations. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data stream.

The filtered output from the filter unit 560 in fact forms the output video signal 480. It is also buffered in one or more image stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 8 times (in each dimension) that of the images stored in the image stores 570. The interpolated images are passed as an input to the motion estimator 550 and also to the motion compensated predictor 540.

In embodiments, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

Figure 7:
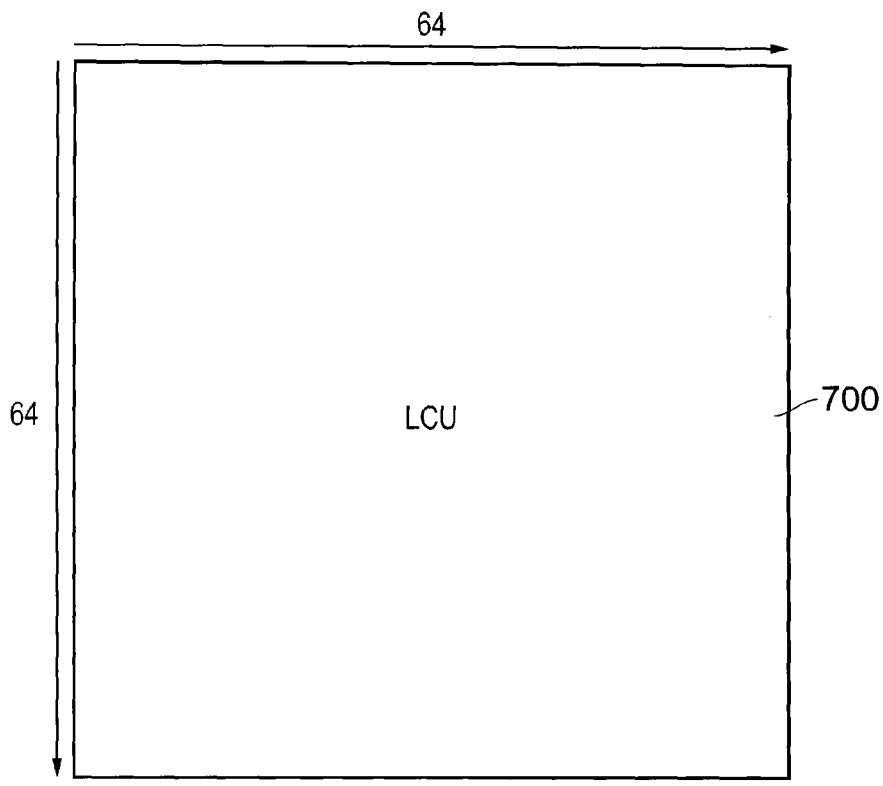
FIG. 7 schematically illustrates a largest coding unit (LCU)

The way in which an image is partitioned for compression processing will now be described. At a basic level, and image to be compressed is considered as an array of blocks of samples. For the purposes of the present discussion, the largest such block under consideration is a so-called largest coding unit (LCU) 700 (FIG. 7), which represents a square array of 64×64 samples. Here, the discussion relates to luminance samples. Depending on the chrominance mode, such as 4:4:4, 4:2:2, 4:2:0 or 4:4:4:4 (GBR plus key data), there will be differing numbers of corresponding chrominance samples corresponding to the luminance block.

Three basic types of blocks will be described: coding units, prediction units and transform units. In general terms, the recursive subdividing of the LCUs allows an input picture to be partitioned in such a way that both the block sizes and the block coding parameters (such as prediction or residual coding modes) can be set according to the specific characteristics of the image to be encoded.

Figure 8:
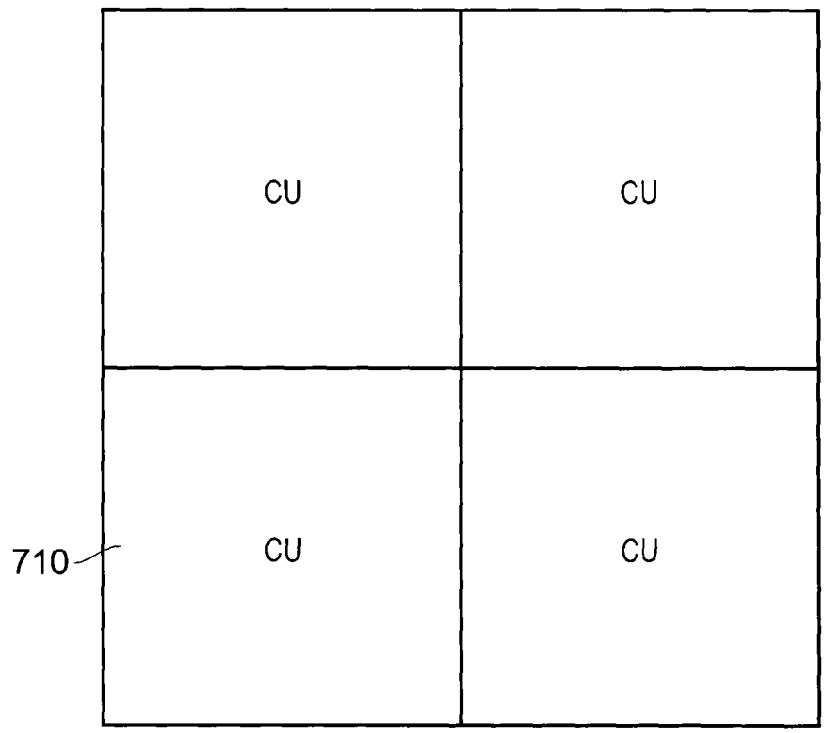
FIG. 8 schematically illustrates a set of four coding units (CU)
Figure 9:
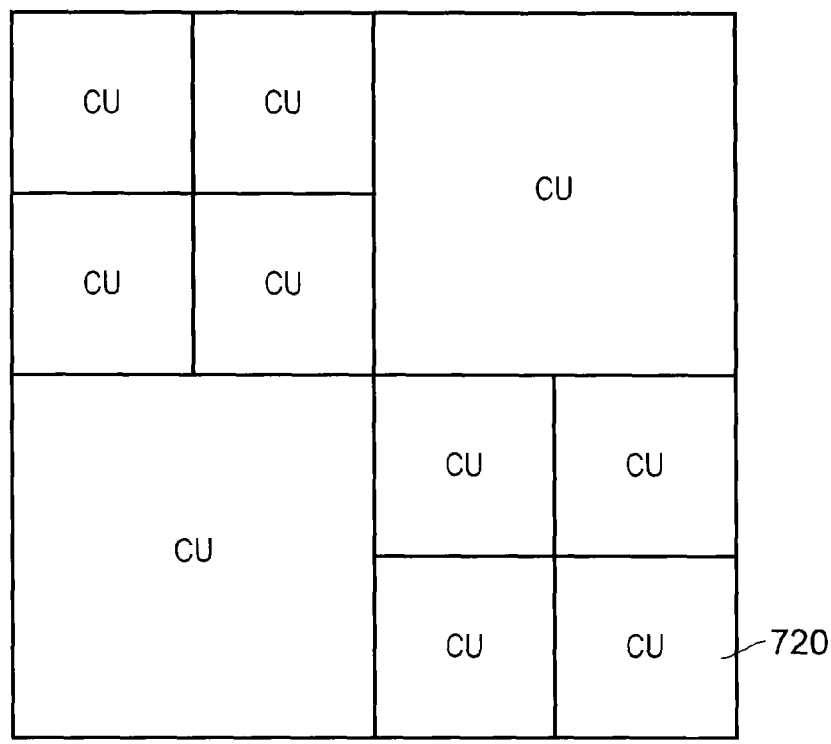
FIGS. 9 and 10 schematically illustrate the coding units of FIG. 8 sub-divided into smaller coding units.
Figure 10:
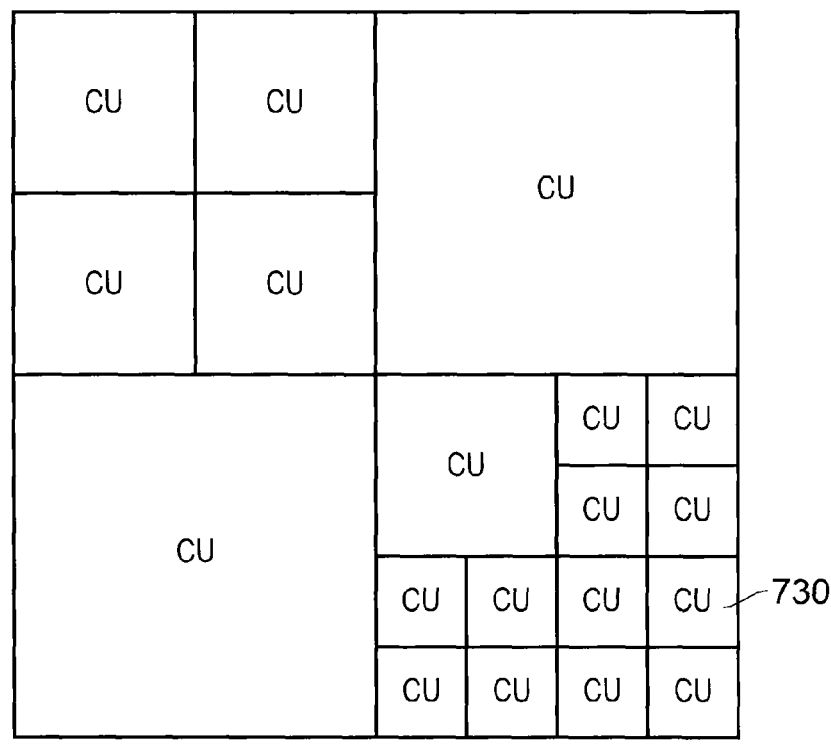

The LCU, which is alternatively known as a coding tree unit, may be subdivided into so-called coding units (CU). Coding units are always square and have a size between 8×8 pixels and the full size of the LCU 700. The coding units can be arranged as a kind of tree structure, so that a first subdivision may take place as shown in FIG. 8, giving coding units 710 of 32×32 pixels; subsequent subdivisions may then take place on a selective basis so as to give some coding units 720 of 16×16 pixels (FIG. 9) and potentially some coding units 730 of 8×8 pixels (FIG. 10). Overall, this process can provide a content-adapting coding tree structure of CU blocks, each of which may be as large as the LCU or as small as 8×8 pixels. Encoding of the output video data takes place on the basis of the coding unit structure.

Alternative terminology also defines a Coding Tree Block (CTB) as a subset of a coding tree unit, based upon the colour component. It is common to code the data CTU by CTU, although there are mechanisms to code the data CTB by CTB. The term "CTU" will be used in the scope of this document, although it should be understood that this can also be extended to the more common of coding CTB by CTB.

The division into CTUs by the encoder, carried out under the control of the controller 345, represents an example of partitioning each image of a video signal into an array of coding tree units.

Figure 11:
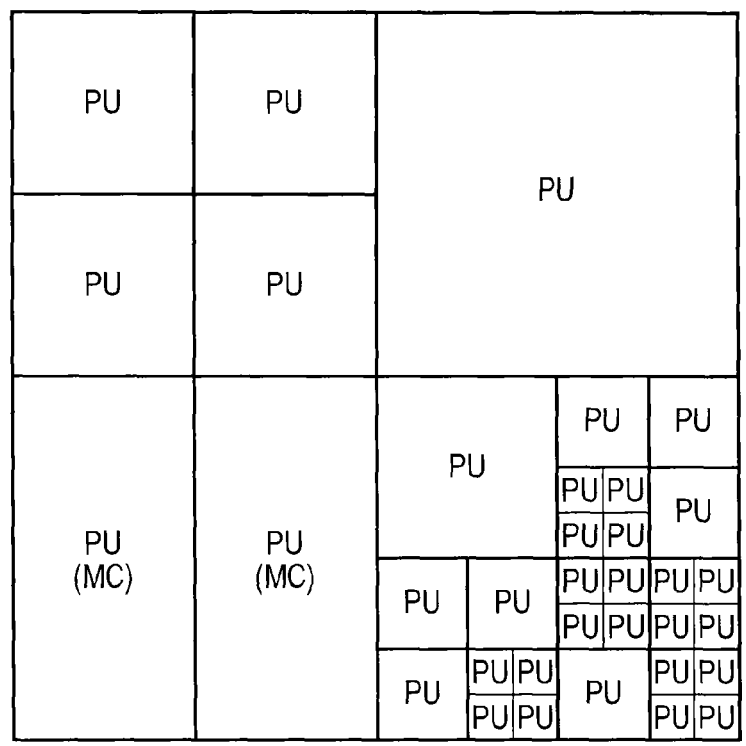
FIG. 11 schematically illustrates an array of prediction units (PU)

FIG. 11 schematically illustrates an array of prediction units (PU). A prediction unit is a basic unit for carrying information relating to the image prediction processes, or in other words the additional data added to the entropy encoded residual image data to form the output video signal from the apparatus of FIG. 5. In general, prediction units are not restricted to being square in shape. They can take other shapes, in particular rectangular shapes forming half of one of the square coding units, as long as the coding unit is greater than the minimum (8×8) size. The aim is to allow the boundary of adjacent prediction units to match (as closely as possible) the boundary of real objects in the picture, so that different prediction parameters can be applied to different real objects. Each coding unit may contain one or more prediction units.

Figure 12:
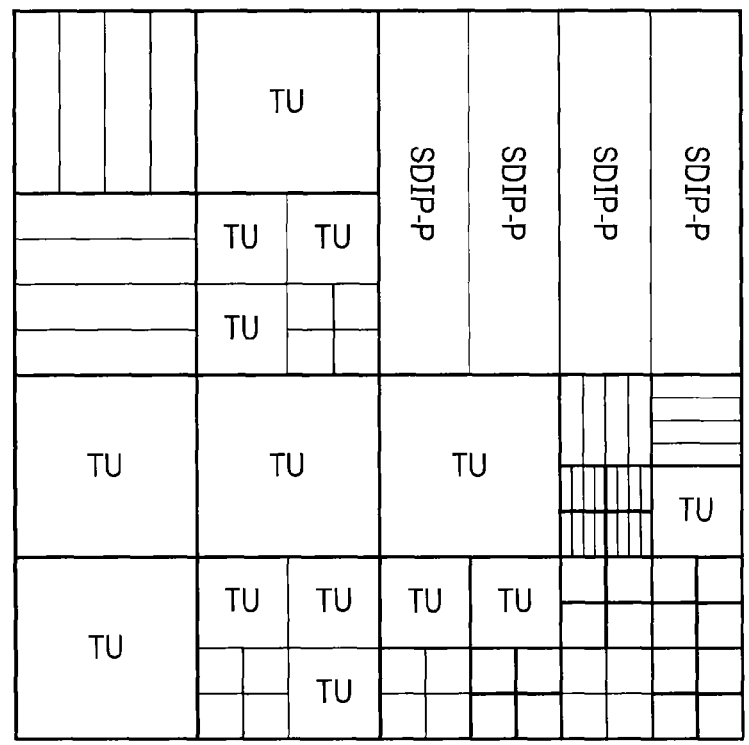
FIG. 12 schematically illustrates an array of transform units (TU)

FIG. 12 schematically illustrates an array of transform blocks or units (TU). A transform unit is a basic unit of the transform and quantisation process. Transform units can take a size from 4×4 up to 32×32 samples, and are always square for 4:0:0, 4:2:0 and 4:4:4 chroma formats, but for 4:2:2 they may be rectangular for higher levels but split in half at the lowest level in order to form square blocks for the actual transform process. Each coding unit can contain one or more transform units. The acronym SDIP-P in FIG. 12 signifies a so-called short distance intra-prediction partition. In this arrangement only one dimensional transforms are used, so a 4×N block is passed through N transforms with input data to the transforms being based upon the previously decoded neighbouring blocks and the previously decoded neighbouring lines within the current SDIP-P.

At least parts of the entropy encoding operations carried out by the entropy encoder 370 can make use of so-called CABAC (context adaptive binary arithmetic coding) techniques. The CABAC context modelling and encoding process is described in more detail in Edition 2 Draft Text of High Efficiency Video Coding (HEVC), Including Format Range (RExt), Scalability (SHVC), and Multi-View (MV-HEVC) Extensions, JCTVC-R1013_v6, 2014-10-01.

A significant feature of the CABAC system is that a particular CABAC bitstream has to be decoded by a single decoder. That is to say, the CABAC data for a particular individual bitstream is inherently serialised, because each encoded value depends on previously encoded values, and cannot be handled by multiple decoders in parallel. However, when decoding video at very high operating points (for example, high bit rates and/or high quality such as professional quality), the CABAC throughput requirement is such that it becomes difficult to implement an entropy-decoder capable of decoding the worst-case frame in a timely manner. With this and other similar throughput constraints in mind, parallel operation of data-processing systems such as HEVC video decoders has been proposed.

Various features are provided by video encoding and decoding systems to allow for parallel operation, for example parallel operation at the decoder. In order to achieve parallel operation without undesirable levels of latency, an image must be divided into portions such that each portion can be decoded independently of other such portions. Without such portions, achieving n-fold parallel operation at the decoder would require a latency of at least 2n frames (because of the latency requirements of the encoder as well as the decoder). But the manner in which this division into portions is achieved can have significant effects on the coding efficiency (a term used here to indicate how well an image of a particular image quality (as recovered after decoding) can be represented by a datastream; a higher coding efficiency indicates that, for a particular image quality, a lower number of data bits are needed to represent the same image quality) as well as the decoder latency and buffering requirements.

One feature which can be used in this manner is the division of an image into a so-called slices. Slices were originally proposed to alleviate the effects of data errors, in that (in at least most respects) any slice can be decoded independently of any other slice. So, if a data error occurs in one slice, that error is not propagated into the decoding of a next slice. But slices also allow parallel decoding operation in some circumstances, in that for an image represented by two or more slices, the fact that the slices can be independently decoded allows multiple slices to be decoded at the same time. However, using slices for this purpose can decrease the coding efficiency, and also because the slice structure is variable and is set at the encoder, it is possible for the encoder to adopt a slice structure or change to a slice structure (such as one slice per picture) which does not allow the required level of parallelism at the decoder.

Slices are used in various coding systems such as those conforming to AVC and HEVC standards. A picture or frame containing a raster-scanned set of CTUs can be split into slices. A slice contains a set of contiguous CTUs (in the raster-scanned order, for example a raster-scanned order of horizontal scan lines from left to right, progressing from the top-left CTU to the lower right CTU), but importantly, the decoding of a slice is completely independent of any other slice in all but some very limited respects.

This means that the picture could be split into n equally-sized slices, with the data representing each slice decoded by a respective independent entropy-decoder. This would reduce the latency of the system to (2+1/n) frames: 1 frame to encode or decode the 1/n of the video in an entropy decoder running at 1/n of the speed, and 1/n of a frame to transmit the data.

A problem arises if the stream contains data that changes the number of slices, as this could affect the latency in the system. For example, a first part of the stream may have a particular slice division, but then a second part of the same stream has a different slice division comprising a smaller number of slices. If as an extreme, the number of slices were to reduce to just 1, then for a system (which can handle a variable number of slices) to cope with this, the system must be configured with the same delay as that of a system which never expects any slices, which in turn would remove the advantages (in terms of potential latency reduction) of using slices. To address this an indicator (min_spatial_segmentation_idc) is provided that can be placed in the stream and which limits the number of pixels per slice to no more than a maximum number of pixels.

Figure 13A:
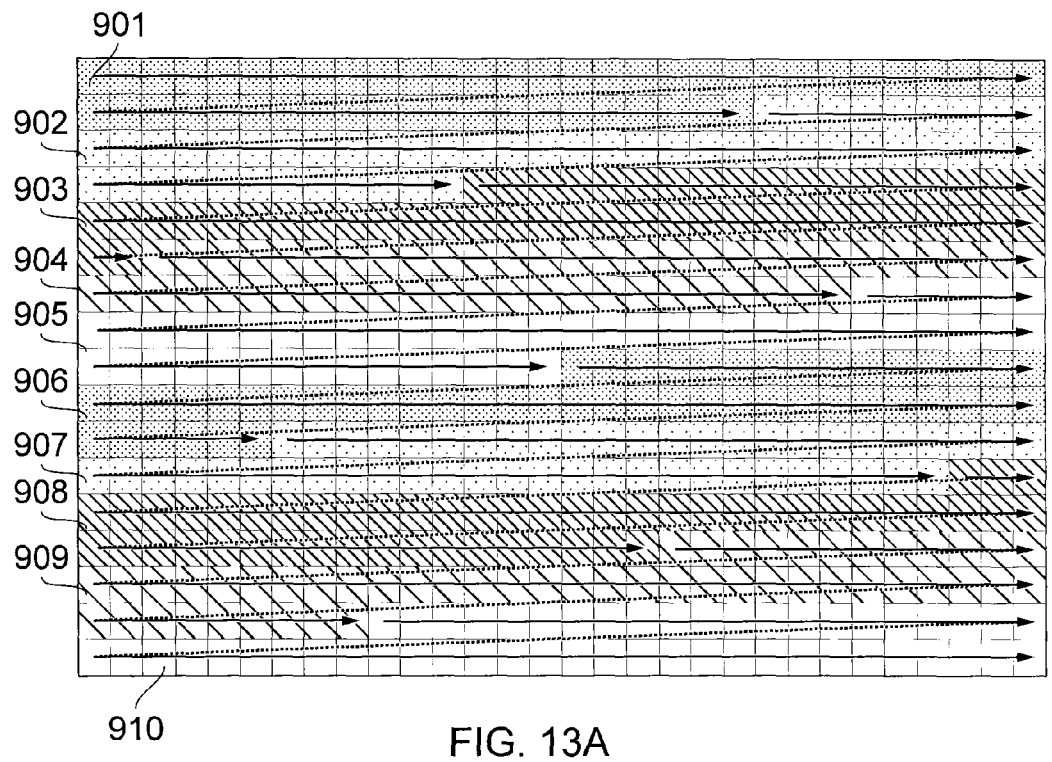
FIGS. 13A and 13B schematically illustrate a slice and a tile structure respectively.

FIG. 13A provides a schematic example of a slice structure, in which an example frame of 17 rows and 30 columns of CTUs 900 is divided into ten equally sized slices 901, 902 . . . 910, each containing 51 contiguous CTUs in a top-left to bottom right raster scanned order (the order being indicated by the direction of schematic arrows drawn within the CTUs). Boundaries between slices are indicated schematically by bold vertical lines, which are present merely for the purposes of the drawing and do not form part of the image.

There is also an option for dependent slices, where the CABAC engine is not reset. These slices are for splitting the CABAC streams data into packets for, for example, network transmission. However, these are not relevant to the present embodiments.

Two further techniques to assist with parallel decoding are provided in the HEVC standards and proposals as they exist at the priority date of the present application, namely the use of tiles and the use of wavefront parallel processing (WPP).

Tiles are in some respects a special form of slicing: they split the image into rectangles of CTUs, and the CTUs are then raster scanned within the tiles. Tiles are defined at the picture level, although there is the ability in the sequence parameter set (SPS) data to indicate that the tile structure is fixed over the entire sequence.

Figure 13B:
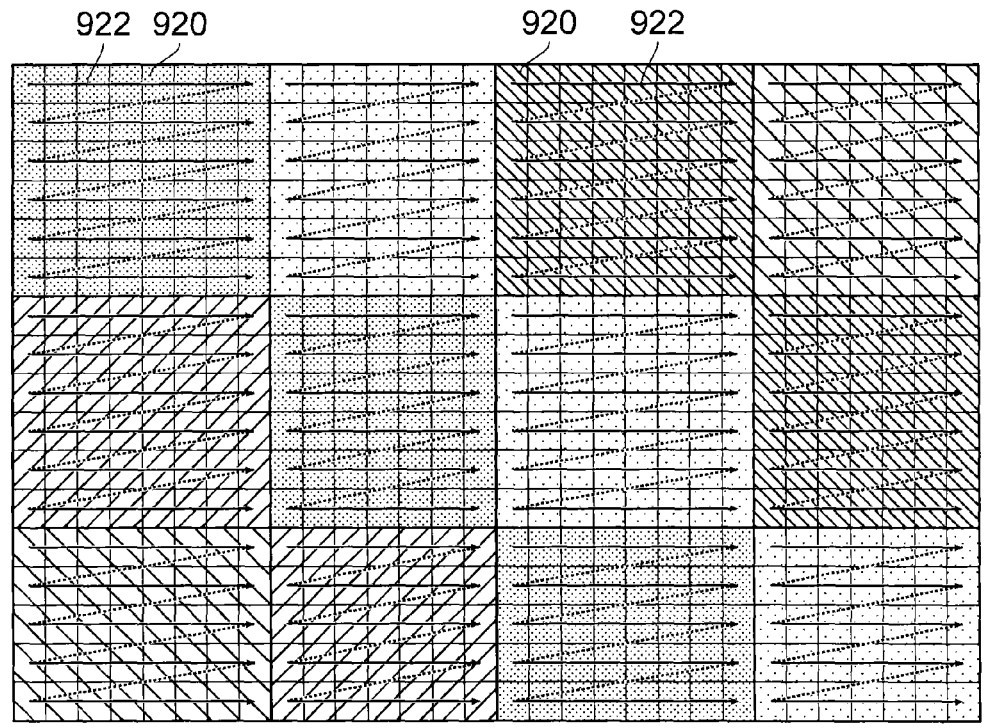

FIG. 13B schematically illustrates the use of tiles, in the context of an example situation in which the frame is formed of 17 rows of 30 CTUs, and each tile is constrained to contain at most 1/10th of the 510 CTUs. This leads to 12 tiles 920, each with at most 48 CTUs. CTUs in a tile are handled (in this example) in the order indicated by the arrows 922. Boundaries between tiles are shown by bold lines in FIG. 13B, but as before, these are merely for the purposes of explanation and do not form part of the image.

Tiles on their own do not offer much in terms of entropy-coding parallelism over that offered by the use of slices; they are merely a different method to partition the image. In addition, if the degree of parallelism required is not a divisor of the number of CTUs such that the number of CTUs divided by the degree of parallelism forms a rectangle number, additional tiling and entropy decoders will be required, as described above with reference to FIG. 13B.

In many respects, each tile can be decoded individually because prediction dependencies and other aspects such as CABAC parameters do not cross tile boundaries. However, some filtering operations are permitted to cross tile boundaries. Within each tile, the CTUs 900 are processed according to a scan order (as indicated by the arrows 922). So, the scan order of processing CTUs for a whole picture involves dealing with the CTUs within one tile, then dealing with the CTUs within another tile, and so on. A particular example will be discussed with reference to FIGS. 17A and 17B below.

The relationship between tiles and slices is constrained so that either or both of the following conditions are true for every slice and every tile in a picture: (i) all CTUs in a slice are from the same tile, and/or (ii) all CTUs in a tile are from the same slice.

Figure 14:
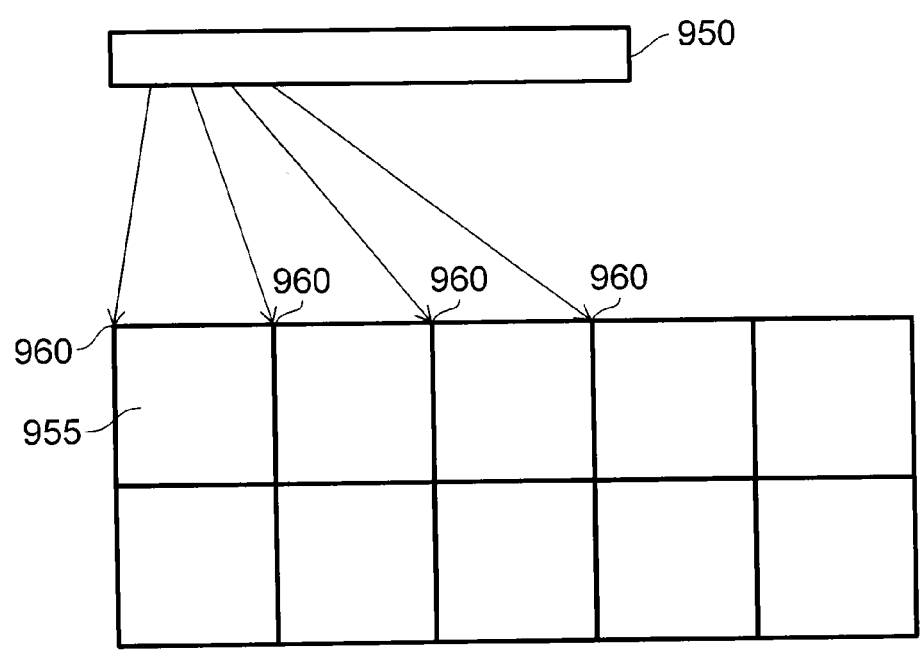
FIG. 14 schematically illustrates header data defining starting points of tiles within a slice.

FIG. 14 schematically illustrates slice header data defining starting points of tiles within a slice. Such pointer data 950 is provided in the encoder datastream at an appropriate position before the actual slice data, such as immediately preceding the slice data. The pointer data 950 provides a succession of values from which the data lengths of each tile 955 within the slice, except for the last, can be calculated (the values are the length in bytes less 1) thereby allowing the starting points 960 to be determined. In example arrangements, such values are the lengths in bytes minus 1.

Figure 15:
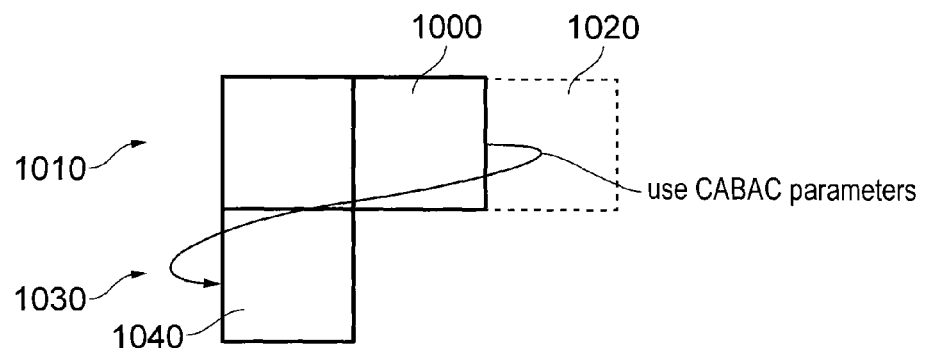
FIGS. 15 and 16 schematically illustrate a wavefront parallel processing (WPP) arrangement.
Figure 16:
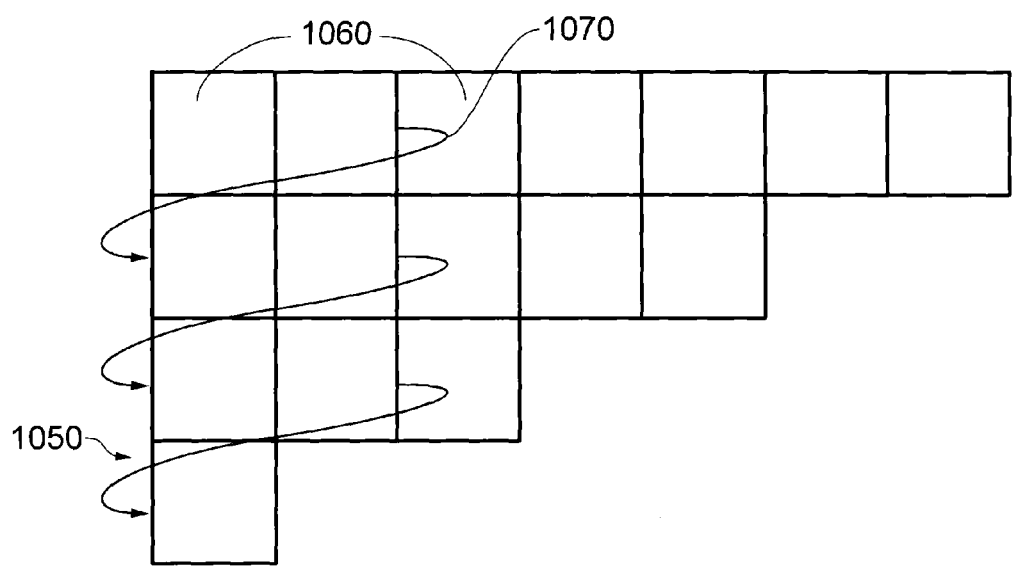

FIGS. 15 and 16 schematically illustrate a WPP arrangement.

Wavefront parallel processing (WPP) is selectable as an option at the encoder and is indicated by a flag (entropy_coding_sync_enabled_flag) in the datastream.

WPP is based on a recognition that intra-image prediction can be constrained so as to use only reference samples within the CTU immediately to the left, immediately to the above left, immediately above or immediately above-right relative to a particular CTU. So, if the CTUs in a picture are considered as successive rows of CTUs, processing the left-most CTU of a current row can start once the first and second left-most CTUs of the row above have been processed. In this way, the rows of CTUs can be handled generally simultaneously, except for a delay of two CTUs from row to row. To improve coding efficiency, and as illustrated schematically in FIG. 15, the CABAC parameters applicable at the end of processing a second CTU 1000 in a current row 1010 are used not only at the start of processing a subsequent CTU 1020 in the current row 1010 but are also passed to the start of the next successive row 1030 for use in respect of encoding a first CTU 1040 of that next row 1030.

FIG. 16 schematically illustrates a WPP process at the start of processing a fourth row 1050 of CTUs 1060. For each row, processing starts once the first and second left-most CTUs of the row above have been processed, and processing of the left-most CTU makes use of the CABAC parameters in existence at the end of processing the second CTU of the row above. In FIG. 16, as in FIG. 15, a curved arrow 1070 schematically indicates the reuse of CABAC parameters by the first CTU of a next row. The CTUs 1060 drawn in bold represent CTUs which have already been processed at the snapshot in the processing represented by FIG. 16.

Accordingly, when wavefronts are used, each row of CTUs can be entropy decoded almost independently: once the second CTU of a row is decoded, the state of the tuned CABAC engine is used to start decoding the next CTU row. Therefore the nth row of CTUs can start to be decoded after 2n CTUs have been decoded (where the top row is row 0).

By way of example, an HD frame may consist of 17 rows and 30 columns of 64×64 sample CTUs, or 34 rows and 60 columns of 32×32 sample CTUs, giving the possibility of 15 or 30 (respectively) wavefronts being active at any one time. Hence the use of wavefronts would potentially address the problems of parallelisation required for HD. In addition, since the CABAC engine is not reset to an initial state dictated by standard parameters such as the quantisation parameter (QP), as is the case when multiple slices are used, and also because intra-prediction can occur over the CTU edges, there is potentially relatively little loss in performance, and in fact in some cases the system performance may improve because the CABAC engine at the start of a CTU has already been adapted to the local video data near the left-hand region being coded, that being on the left-hand region of the row above, rather than potentially significantly different video data in the right-hand region of the row above.

Accordingly, a general view of WPP processing is that (i) rows of coding blocks such as CTUs are encoded so that encoding prediction dependencies are not broken at row boundaries and (ii) encoding parameters such as CABAC parameters are propagated or copied from an intermediate position along a row to the start of the next row. The intermediate position may correspond to a position at which, during encoding of a row, sufficient blocks of that row have been encoded so as to allow a first block of the next row to be encoded. An example of such an intermediate position is the end of encoding of the second block. Note that the term "parallel" in "wavefront parallel processing" does not imply that every coding operation can be carried out at the same time, as between one row and another row, but rather that (as discussed above and indeed as indicated by the term "wavefront") the parallel operation is a progressive one, so that at least part of the encoding or decoding operations relating to one row can overlap in time with corresponding encoding or decoding operations in respect of the preceding row.

A potential disadvantage of WPP techniques, in the context of reducing latency in a parallel decoding arrangement, will now be described.

Unlike slices which can encoded into the bitstream independently and consecutively, wavefronts need to be collated before they are put into the stream. This is because (in a similar manner to that described above with respect to FIG. 14) the slice header contains a list of offsets into the NAL unit for the start of each wavefront.

Wavefronts can therefore reduce the latency of the system, although due to the collation of the header data, the reduction is potentially not as good as slices on their own.

Figure 17A:
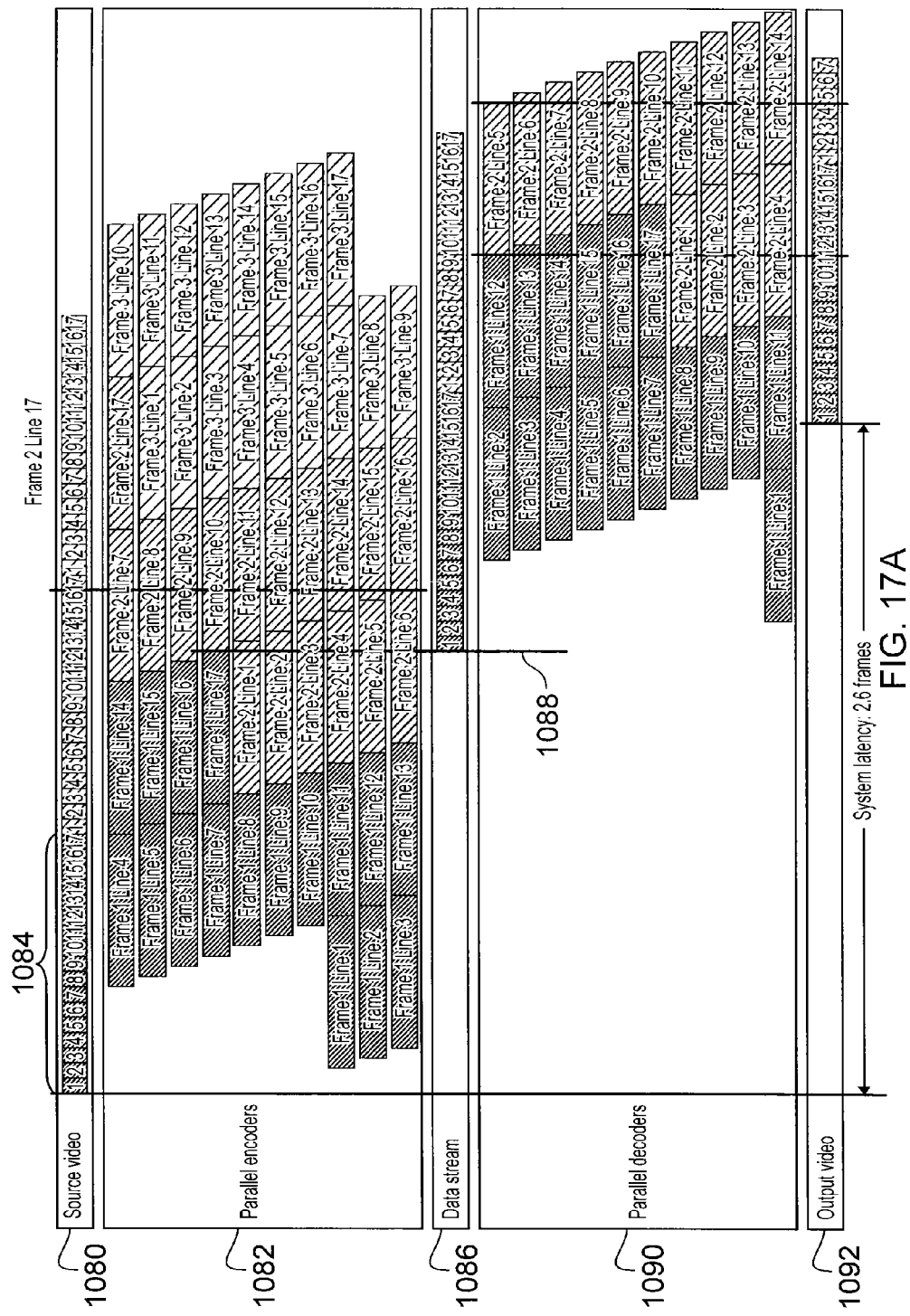
FIGS. 17A and 17B are schematic timing diagrams.

This is illustrated by way of example, in FIG. 17A for the example situation of 10 parallel encoders/decoders using WPP with respect to complete frames of HD video (17 rows or lines of 30 CTUs).

A top row 1080 indicates the timing of rows of CTUs in the original (source) video, numbered from 1 to 17 on a repeating cycle (one cycle of 1-17 for each frame). A next portion 1082 indicates the timing of a ten-fold parallel encoding operation. Fundamentally, the encoding of a row of CTUs cannot start until that row has been received as part of the source video. The encoding of a row takes a time period equivalent to that of ten rows of source video (because the encoding is carried out on a ten-fold parallel basis). Because of the need to collate the wavefronts before they can be output to the datastream, data representing a first frame 1084 of the source video cannot even start to be output to the data stream 1086 until a point 1088 in time at which the last row of CTUs of the frame 1084 has been encoded.

The first row of CTUs in the data stream cannot start to be decoded until it has been received, and then there is a ten-row period for decoding (because of the ten-fold parallel operation in this example). The timing of decoding of the other rows (indicated by the portion 1090 of FIG. 17A) is set so as to be able to output the whole decoded stream 1092 contiguously once it has started to be output, that is to say, without having any gaps to wait for any CTU to be decoded.

The schematic arrangement of FIG. 17A gives a net delay or latency of 2.6 frames, although the exact delay in a particular implementation is dependent on the particular phasing of the use of the encoders and decoders.

Figure 17B:
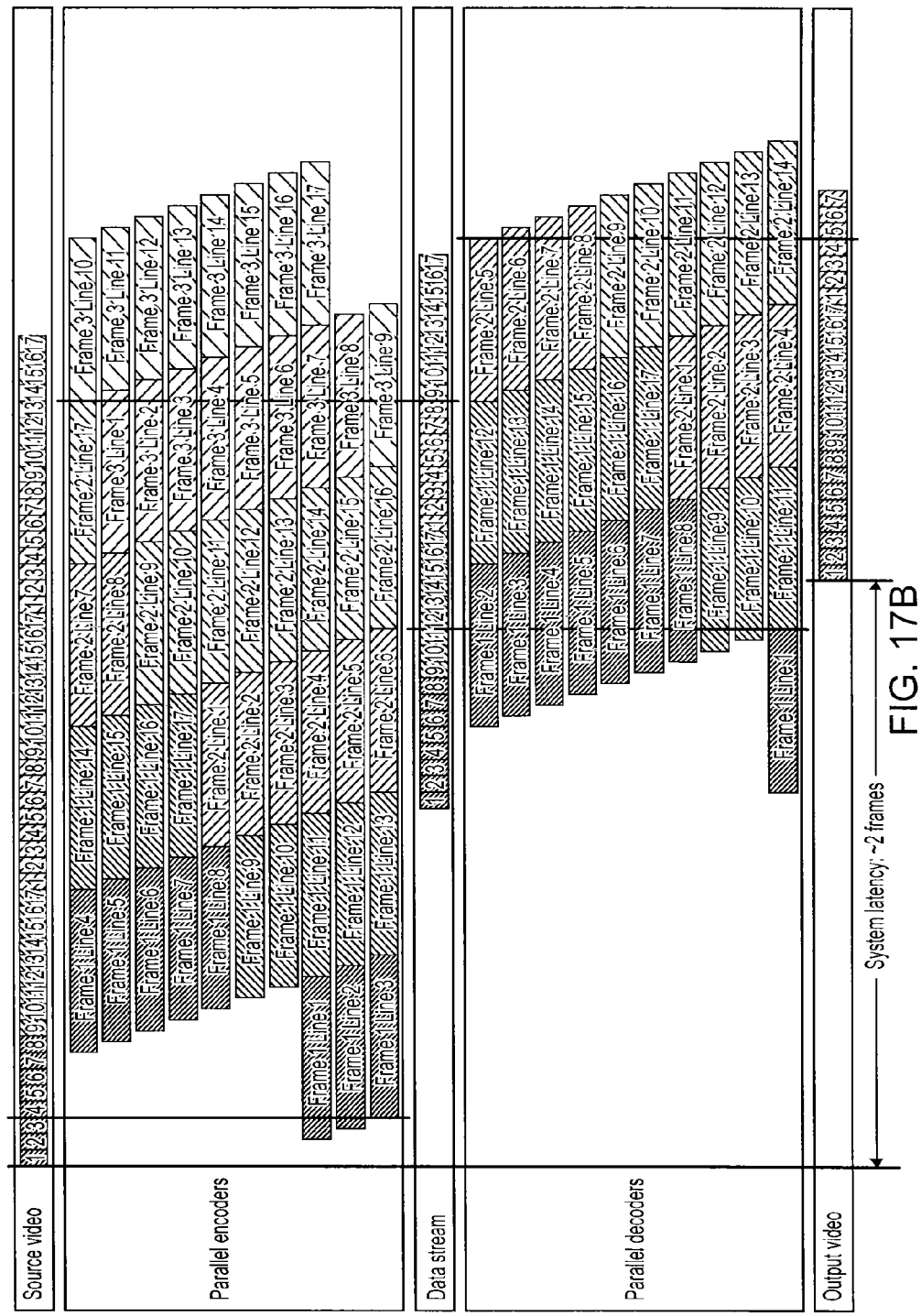

The latency can be reduced by introducing slices as well as wavefronts: 2 slices would reduce the latency to around 2 frames' delay, as illustrated in FIG. 17B, which is a similar schematic timing diagram of the encoding and decoding of lines or rows of CTUs when using wavefronts with 17 rows of 30 CTUs per frame, 10 parallel encoders and decoders, and 2 slices. A first slice of each frame comprises (in this example) the rows or lines 1-8, and a second slice of each frame comprises (in this example) the rows or lines 9-17.

While still complying with the constraints discussed above (a row cannot be encoded until it has been received; the output data for a slice cannot be passed to the stream until the whole of that slice has been encoded; decoding of a row cannot start until that row has been received in the stream; and the output of decoded data is timed so as to provide for contiguous output once the output process has started), the system delay is now approximately two frames.

However, the number of wavefronts does not increase with the number of pixels, but with the number of columns (or rows). This means that some higher resolution and frame rate video formats may contain a lot of video data but might not contain enough rows of CTUs to satisfy the parallel requirements.

Examples of these techniques will now be described.

Figures 18, 19:
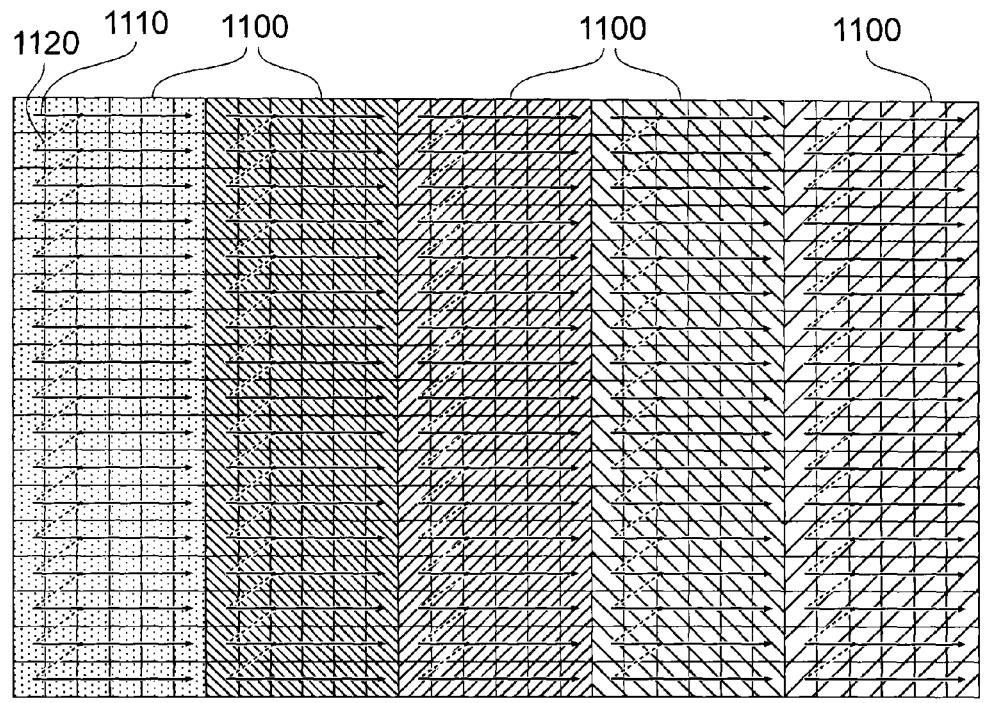
FIG. 18 schematically illustrates a tile structure used with WPP.
FIG. 19 schematically illustrates an example image.

FIG. 18 schematically illustrates an example tile and wavefront structure, and indeed provides an example of the encoder (under the control of the controller 345) partitioning the array of coding tree units of each image into a portion pattern of rectangular portions for independent encoding such that the prediction dependencies of samples within a portion do not extend into any other portion and the entropy encoding parameters of one portion are independent of those of any other portion, the portion pattern being such that each row of coding tree units is partitioned into at least two of the portions. The portions may be, for example, tiles or slices.

In particular, FIG. 18 schematically illustrates a combination of the use of five tiles 1100 (each shaped as a column of CTUs six CTUs wide by the full height of the picture). The use of WPP techniques within each tile is indicated schematically by the use of scanning arrows 1110 showing the horizontal order of coding within a tile, and by broken-line diagonal arrows 1120 indicating that the CABAC parameters applicable at the end of encoding or decoding the second CTU of each row are passed to the coding of the start of encoding or decoding of the first CTU of the next row.

This example arrangement allows a picture to be split into, say, 5 tile columns, each of which is independently decoded and split into wavefronts. After around just two lines of CTUs, the 10 parallel encoders or decoders will have encoded (or decoded) the two lines.

The arrangement provides an example of the encoder (under the control of the controller 345) encoding the coding tree units within each portion using wavefront parallel processing in which, for each portion, successive rows of coding tree units within the portion are encoded so that encoding dependencies are not broken at row boundaries and encoding parameters are propagated from an intermediate position along each row of the portion to the start of the next row of coding tree units.

However, the HEVC standards specify that the wavefronts in the first tile are placed in the bit stream prior to the wavefronts in the second tile, and so on, and again, the offsets of each wavefront (of which there are 85 in FIG. 18) must all be present in the stream at the start of each picture's access unit. This means that, although the system latency is reduced by the combination of WPP and tiles, other constraints on the format of the datastream can act to reduce the effectiveness of this reduction in latency.

Possible techniques for addressing these issues will now be discussed.

FIG. 19 schematically represents a CTU structure, in which a picture is split into 7 rows of 12 CTUs. A smaller number of CTUs is used in this example (compared to the previous examples of 17 rows of 30 CTUs) merely for clarity of the following discussion and of the diagrams. It will be appreciated that the techniques to be discussed below can apply to different, including larger, numbers of CTUs. The CTUs can be configured to be 64×64, 32×32 or 16×16 in the SPS (sequence parameter set). In FIG. 19, the CTUs are numbered in the order that they are present in the source video stream.

Also as discussed above, a picture can be made up of multiple slices (it will always be at least one slice). A slice contains a single collection of consecutively numbered CTUs. Those CTUs do not share any data with any previous slice of the same picture (although inter prediction allows the source data to be from any position on a previously decoded frame). The slices indicate their first CTU number.

A slice can also be split into wavefronts. This splits the slice into rows of CTUs, with an indicator in the slice header of how many bytes each wavefront takes (there are N−1 entries for a picture with N rows, since the last row's length is not required).

At the start of each row or line of CTUs, the entropy coder is set to the state of the CABAC engine at the end of processing the second CTU of the line above (if that CTU is outside the slice, then it is set to a standard initial state). A constraint applies in that with wavefronts enabled, if a slice starts part way along a row of CTUs (rather than at the beginning of that row), that slice must finish on the same row.

So, referring to the example numbering of FIG. 19, prior to coding CTU #12 (where the "#" symbol represents "number"), the CABAC engine will be initialised to the state applicable at the end of processing CTU #1. More generally, prior to coding CTU #n*12, the CABAC engine will be initialised to the state at the end of processing CTU #(n−1)*12+2.

A slice can contain multiple tiles, or a picture can contain multiple tiles which can themselves contain multiple slices. The tile structure is defined in the PPS (picture parameter set), and therefore not within the slices themselves. In effect, if a slice starts mid-tile, it must finish within the same tile. The portions may for example be tiles. In respect of the present embodiments, in some examples the portions may be slices containing more than one tile, or more than one time containing one or more slices.

Tiles change the order of CTU coding. They reset the CABAC engine prior to the first CTU in the tile. They also do not permit intra-prediction across boundaries, although the deblocking and SAO loop-filters can optionally be applied.

Figures 20, 21:
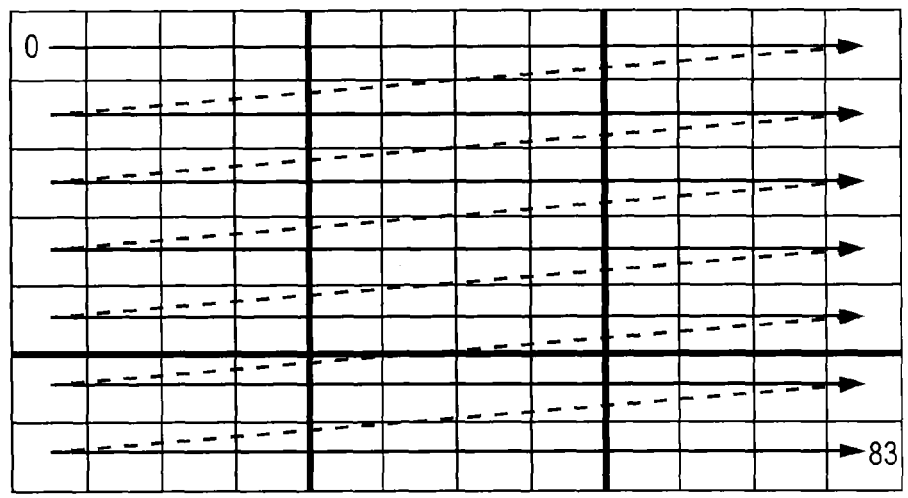
FIG. 20 schematically indicates an encoding order.
FIG. 21 schematically indicates a data output and/or transmission order.

FIG. 20 provides a schematic example of the picture of FIG. 19, split into 3 columns of tiles, and 2 rows of tiles, with the tile structure being shown schematically by bold lines indicating tile boundaries. Note that this is just an example; the heights and widths of the rows and columns respectively can be independently configured in the picture parameter set (PPS), and the arrangements shown are merely examples.

The CTUs in FIG. 20 are coded in the order shown, which is to say that the numbers inside each small box representing a CTU indicate the order of encoding.

This order is also acceptable (and indeed in conformity with at least some standards such as HEVC standards) as an order for data storage. However, as discussed in detail below, in streaming data applications, a different order of output and/or transmission of the data can provide advantages in terms of reducing latency. As discussed below, the encoded data can be re-ordered for streaming or can be encoded in the streaming order (and, if necessary, re-ordered for storage as a standards-compliant storage format).

Note that FIG. 20 represents the tile structure. It does not represent the slice structure, which could be one slice per picture or multiple slices per picture. If a slice contains multiple tiles, it has multiple length entry points. So if the picture has 1 slice with the 6 tiles in it, the slice will contain an indication of how long each of the first 5 sets of tile data is. If a picture has 12 slices, each containing a fraction of a tile, no special indication is required, as the NAL unit structure delimits each slice.

In the present arrangements, a flag is used in the SPS that indicates that the tile structure is the same for all frames (without this, the system would have to assume that at any point in time tiles might not be used, and therefore parallelism could only be guaranteed across multiple frame decoding). If wavefronts are enabled, they are enabled for the entirety of the coded-video stream.

In embodiments of the disclosure, tiles and wavefronts may be enabled simultaneously.

This means that in the context of FIG. 20, if there is just 1 slice with the 6 tiles in it, that slice will have 20 entry points indicating the size of each of the 21 sub-rows of CTUs.

Each of these entry points can be decoded almost in parallel, except (as discussed earlier) noting that CTU #4 (in the numbering scheme of FIG. 20) has to wait until CTU#2 is decoded so that it can initialise the CABAC engine, and so that the prediction data is available. Also, CTU #24 has to wait until CTU #22 has been decoded, and so on.

But in a live-streaming system, in which there is a desire to decode and output the video data as soon as possible after its original input to the decoder, the order in which the CTUs are processed in the arrangement of FIG. 20 above can impose some undesirable restrictions on the latency of the system. In particular, in this example, the processing order of FIG. 20 means that all of the data required for decoding the top row will be available for decoding only after 44 CTUs have been transmitted (that is to say, CTUs 0-43 as numbered).

In addition, because the slice header needs to have all of the lengths of each of the segments of the picture, the header is not fully known until 76 CTUs have been encoded, and only at that point can the transmission of the data for the frame begin.

This could lead to a significant delay in the system.

Embodiments of the present disclosure address this latency issue by reordering the encoded data for transmission.

The coding dependencies remain as shown by the order of FIG. 20.

But data is actually transmitted in a modified order, equivalent to raster scan. In some examples, this can just involve the rearranging of the sub-rows of data, where a sub-row is defined for the purposes of this discussion as the extent of a row within a single tile (in other words, a wavefront). So, for example, a sub-row starting with CTU#0 contains CTUs #0, #1, #2 and #3.

In an example, the order of transmission could be:
send sub-row that has CTU #0, then
send sub-row that has CTU #20, then
send sub-row that has CTU #40, then
send sub-row that has CTU #4, and so on.

This means (in this example) that the system would have all of the required data to decode the top row after just 12 CTUs have been transmitted.

FIG. 21 provides a schematic example of a data transmission order in respect of the encoded data of FIG. 20, involving the encoder (under the control of the controller 345) outputting the encoded coding tree units according to a raster order of successive complete rows of the array of coding tree units. The transmission order is a raster-scan order starting at a top left CTU and proceeding, row by row, to a lower right CTU. More generally, and taking into account other examples such as those shown with respect to FIGS. 29A and 29B, the outputting is according to an order with respect to the array of coding tree units which is different to a raster order of coding tree units within successive respective portions.

Data coded according to the modified (streaming) order may not be format-compliant with standards such as the HEVC standards, but can easily be converted to a standard HEVC arrangement by a simple data reordering, without requiring the decoding or encoding of CTU data. The adjustment made to the stream for transmission is that the tiled-wavefronts are sent over the network in raster scanned order. In addition, each tiled-wavefront indicates its own length (or is associated with data indicating its length), thereby removing the delay in creating the slice header table. The slice header is left with dummy values inserted, which may be equivalent in extent to a full header, or may simply represent a place-holder in the data stream of the minimum length needed to indicate that the requirement to include a slice header has been complied with. Or (for example in the case of reordering the data of an already-encoded stream) the original slice header data could be left in place, for example to cater for any situation in which the data might be re-ordered back to a format compliant stream, but just not used as slice header data in the normal manner. This provides an example of associating dummy portion header data with the encoded coding tree units.

Figure 22:
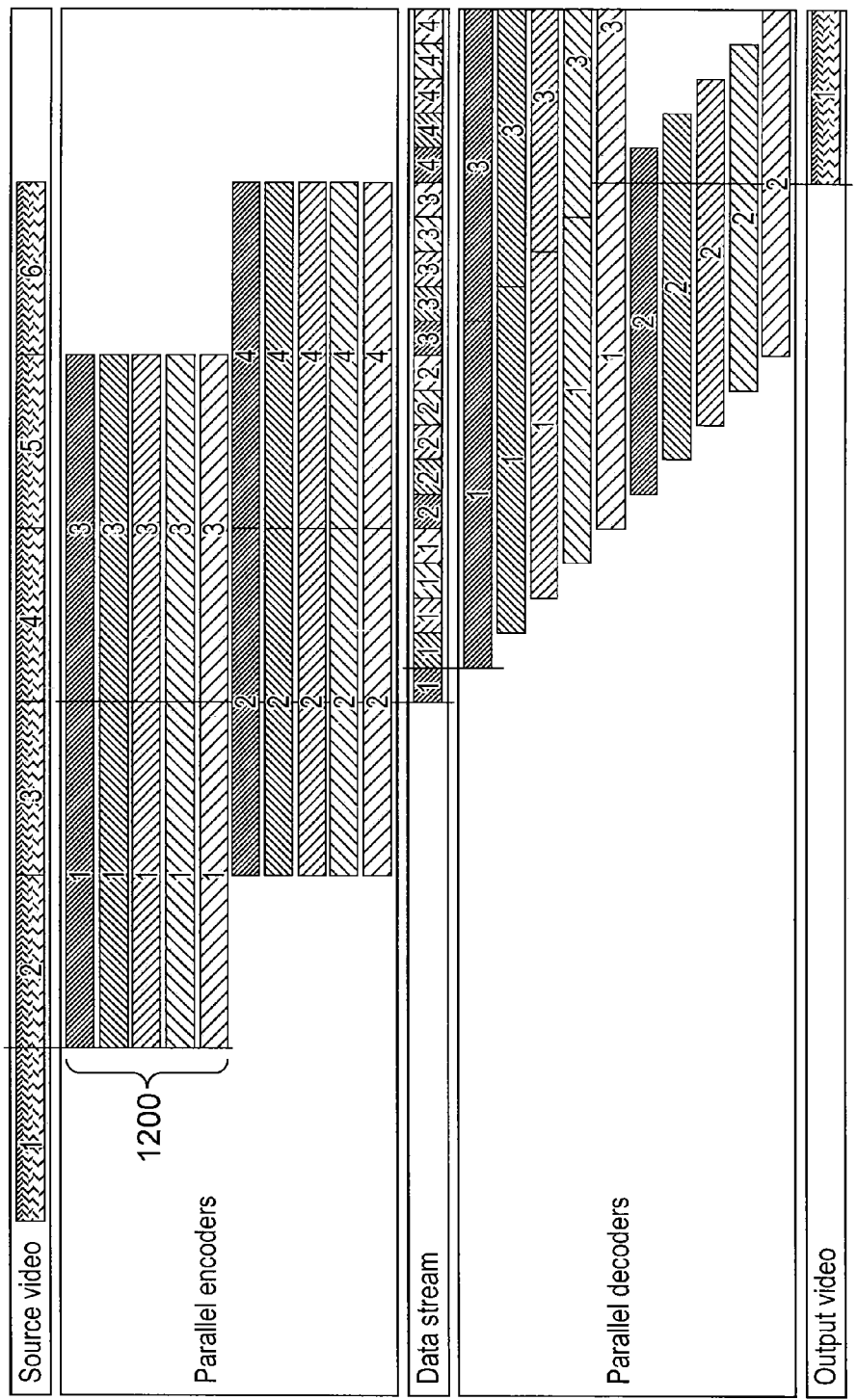
FIG. 22 is a schematic timing diagram.

This means that the total latency of an encoding and decoding system which operates at $1/10^{th}$ video rate but with 10 parallel systems available in order to meet the video rate requirements of coding HD video, can be reduced to just around four rows of CTUs (the delay incurred by two rows of CTUs of a picture with 5 tile columns at each of the encoding and decoding sides), plus the delay of the transform, prediction and the like (implementation dependent), plus the delay incurred by converting the input video from pixel line-by-line to CTU-line-by-line (typically equivalent to 1 line of CTUs in the encoder and decoder). With CTUs of size 32×32, this could yield a system delay as little as about 192 lines of video for HD (1+2+2+1=6 rows of CTUs; 15% of 1 frame; 1/400 seconds), as illustrated in the timing diagram of FIG. 22, which follows a similar notation to FIGS. 17A and 17B, and represents an example timing for HD video when wavefronts and 5 column tiles (of the form of FIG. 18) are used. Tile columns are shown via different shading and CTU row number is shown numerically, so that the five portions 1200 labelled "1" in the encoding timing diagram represent the contributions of row 1 to each of five respective tiles. Source and output video are assumed in pixel-row-raster scan, and the delay to buffer the data and convert to/from CTU row scanning is shown. System latency is potentially 1/400s for 60P.

Accordingly, a useful feature of tiles in combination with wavefronts is not the number of rows of tiles but the number of columns. If a system were designed that required 30 parallel entropy decoders in order to maintain video rate, then with a system with no tiles or wavefronts, the system delay would be 30 frames. If wavefronts were used, then the system delay would be 30 rows+2*30 CTUs (the 2*30 is due to the delay of 2 CTUs between decoding successive rows of CTUs). If tiles were used, then the delay depends on the heights of the tiles, and if there is only 1 tile row and 6 tile columns, the delay would be ~5 frames. If wavefronts and 6 columns of tiles were used, the system delay would be 5 rows+2*5 CTUs plus any delay incurred due to data re-ordering and internal processing.

Also, if 4K is coded by 4 HD encoders, one for each 1K×2K column, then the interleaving of the data would be significantly easier, and also incur minimal delay. Without this modified order, the interleaving system would need to buffer up columns 2, 3 and 4, until column 1 has finished encoding.

In particular, for 4K-60P video, for a system that operates a $1/40^{th}$ of video rate speed, but with 40 parallel coding systems, 10 tile columns could be used, and the number of lines of CTUs required to meet the parallel requirements would increase from 2 to 4 for the encoder and decoder. The video would be available after ~320 lines of video (15% of 1 frame; 1/400 seconds).

For 4K-120P video, the number of encoders and decoders required to attain video rate might be doubled, and the number of lines of CTUs required to meet the parallel requirements would increase from 4 to 8. The video would be available after or 576 lines of video for 4K-120P (27% of 1 double-frequency frame; 1/450 seconds).

An alternative would be to not use tiles and wavefronts with the modified ordering, but instead use multiple slices to split the picture up into the same size chunks as achieved in the above diagram. However, there is a limit to the number of slices that can be specified (dependent on the Level; 75 for Level 4 (a profile used for video resolution up to HD); 200 for Level 5 (a profile used for video resolution up to so-called 4K); and 600 for Level 6 (a profile used for video resolution up to so-called 8K). In order to achieve a similar system delay as described by the modified system, the picture would need to be split into segments as small as a few CTUs per row (the same number of CTUs as would be in each column). This configuration would be possible for some of the defined Levels, but since the CABAC engine is reset at the start of each slice, and intra prediction cannot use data outside the current slice, this potentially incurs coding inefficiency.

Figure 23:
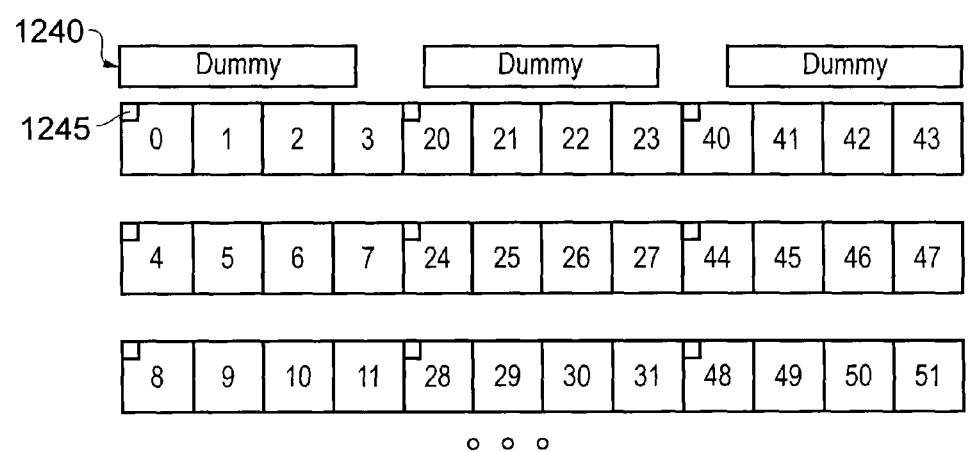
FIG. 23 schematically indicates a data format.

As discussed above, if an overall low system latency is required, CTU data can be encoded in the transmission order discussed above. This arrangement corresponds to the schematic timing diagram of FIG. 22. In order to achieve this, the controller 345 controls the operation of the encoder so that the CTU is encoded by WPP and formatted as tiles are handled in a raster-scan order rather than in a tile-by-tile order, and data is provided in association with each CTU indicating the size of that CTU. In an alternative, however, conventionally encoded data (that is to say, CTUs encoded according to a tile structure and using WPP) may be re-ordered for transmission. FIG. 23 schematically illustrates an example format of the CTU data for transmission.

Figure 24:
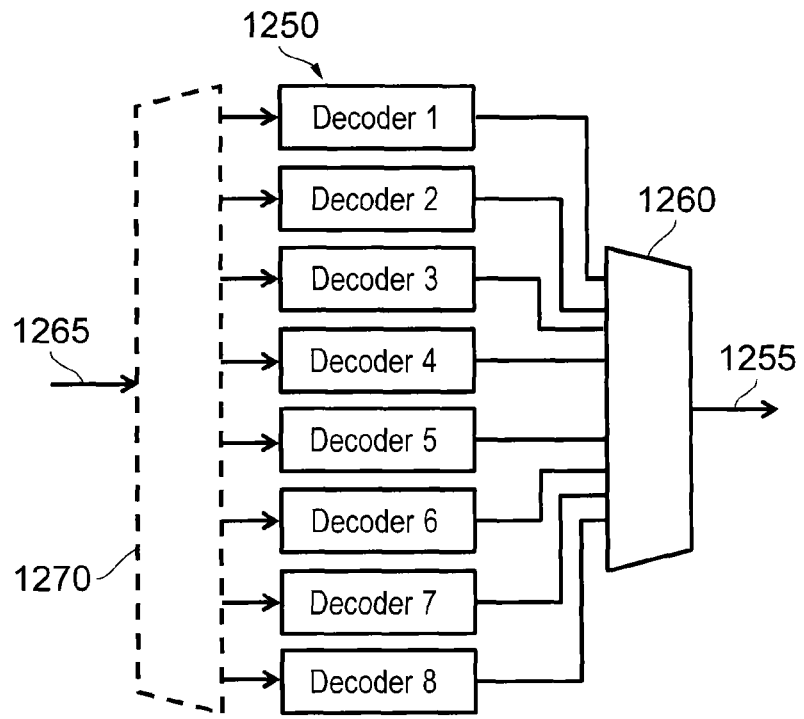
FIG. 24 schematically illustrates a parallel decoder.

In FIG. 23, dummy data 1240 is provided in place of the slice header(s), along with data representing each CTU in turn, in the raster-scanned order discussed above. Each wavefront (each row of each tile in this example) comprises an indicator 1245 providing an indication of the length or size of that wavefront data, provided as an example of associating indicator data with each row of encoded coding tree units from each portion, the indicator data indicating the extent of the encoded data representing that row of encoded coding tree units from that portion FIG. 24 is a schematic diagram of a parallel decoder, which in this example comprises eight decoders 1250, the outputs of which are combined into output decoded video data 1255 by a multiplexer 1260. The decoders 1250 can operate on individual respective encoded data streams or, in the case that the encoded data 1265 has been ordered for transmission as a single datastream according to the techniques described above, a demultiplexer 1270 is used to route the appropriate encoded data to each of the parallel decoders. Both the multiplexer 1260 and the demultiplexer 1270 can comprise buffer memory so that the appropriate data is delivered to each decoder or recombined into the output datastream 1255 at the appropriate time relative to other encoded or decoded data. This decoding arrangement provides an example of decoding coding tree units encoded according to the techniques described above, the technique comprising decoding, in parallel with respect to at least two of the portions (for example in a row direction of the portion pattern), the coding tree units within corresponding rows of each portion using wavefront parallel processing.

Figure 25:
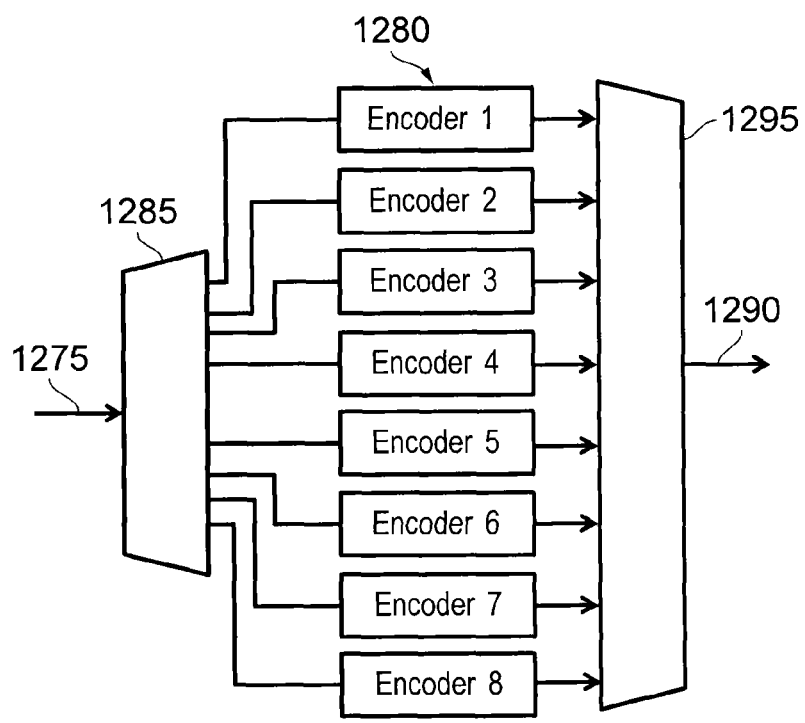
FIG. 25 schematically illustrates a parallel encoder.

FIG. 25 is a schematic diagram of a parallel encoder operating according to the principles discussed above. A source video stream 1275 is routed to each of a set 1280 of parallel encoders (eight in this example, but different numbers may be used) by a demultiplexer 1285. The encoded data from each of the encoders 1280 is combined into an output datastream 1290 by a multiplexer 1295 according to the data order discussed above.

FIG. 26 schematically illustrates a data reordering arrangement in which encoded CTUs are written into a buffer memory 1300 in the encoding order shown in FIG. 20 under the control of a controller 1310 (corresponding to a step 1320 of FIG. 27), and are read out of the buffer memory 1300 in the order shown in FIG. 21, again under the control of the controller 1310 (corresponding to a step 1330 of FIG. 27).

FIG. 27 is a schematic flowchart of the data re-ordering process. Note that the process can be used either to re-order encoded data back into a compliant form, in which case a step 1335 of recreating tile headers is applied, or to re-order encoded data for transmission (in which case the process is similar except that the step 1335 relates instead to creating wavefront headers or other indicator data and dummy header data as discussed with reference to FIG. 23 above). This process, when used to re-order the data back to a standards-compliant tile-by-tile format, provides an example of the step of re-ordering the encoded coding tree units for storage, so that the coding tree units are stored in a portion-by-portion arrangement, and of associating portion header data with the re-ordered encoded coding tree units for a portion, the portion header data indicating at least the location, within the re-ordered coding tree units for that portion, of each row of encoded coding tree units. When applied to reformatting format-compliant data for transmission, the steps provide an example of associating dummy portion header data with the encoded coding tree units.

FIG. 28 is a schematic flowchart illustrating operations of the apparatus of FIG. 5, to achieve the encoding structure of FIGS. 20 and 21.

At a step 1340, a tile mode is established by the encoder and at a step 1350 a WPP mode corresponding to the encoding taking place within each tile is established by the encoder. At a step 1360 the encoder encodes the CTUs according to the tile and WPP modes. In some examples, such as those described with reference to the timing diagram of FIG. 22, the CTUs are encoded in the required order for transmission as discussed above. In other examples, the encoded CTUs (encoded according to the order of FIG. 20) are re-ordered by a step 1370, the step 1370 also including the wavefront header or other indicator data discussed with reference to FIG. 23.

Further aspects of 4K video encoding and decoding will now be discussed.

As illustrated earlier, for a 4K-60P video, 10 tile columns could be used, and the number of lines of CTUs required to meet the parallel requirements might increase over that of an HD system from 2 to 4 for the encoder and decoder. The video would be available after about 320 lines of video (15% of 1 frame; $\frac{1}{400}$ seconds).

Similarly, for 4K-120P video, the number of encoders and decoders would be doubled, and the number of lines of CTUs required to meet the parallel requirements would increase from 4 to 8. The video would be available after 576 lines of video for 4K-120P (27% of 1 double-frequency frame; $\frac{1}{450}$ seconds).

Figures 29A, 29B:
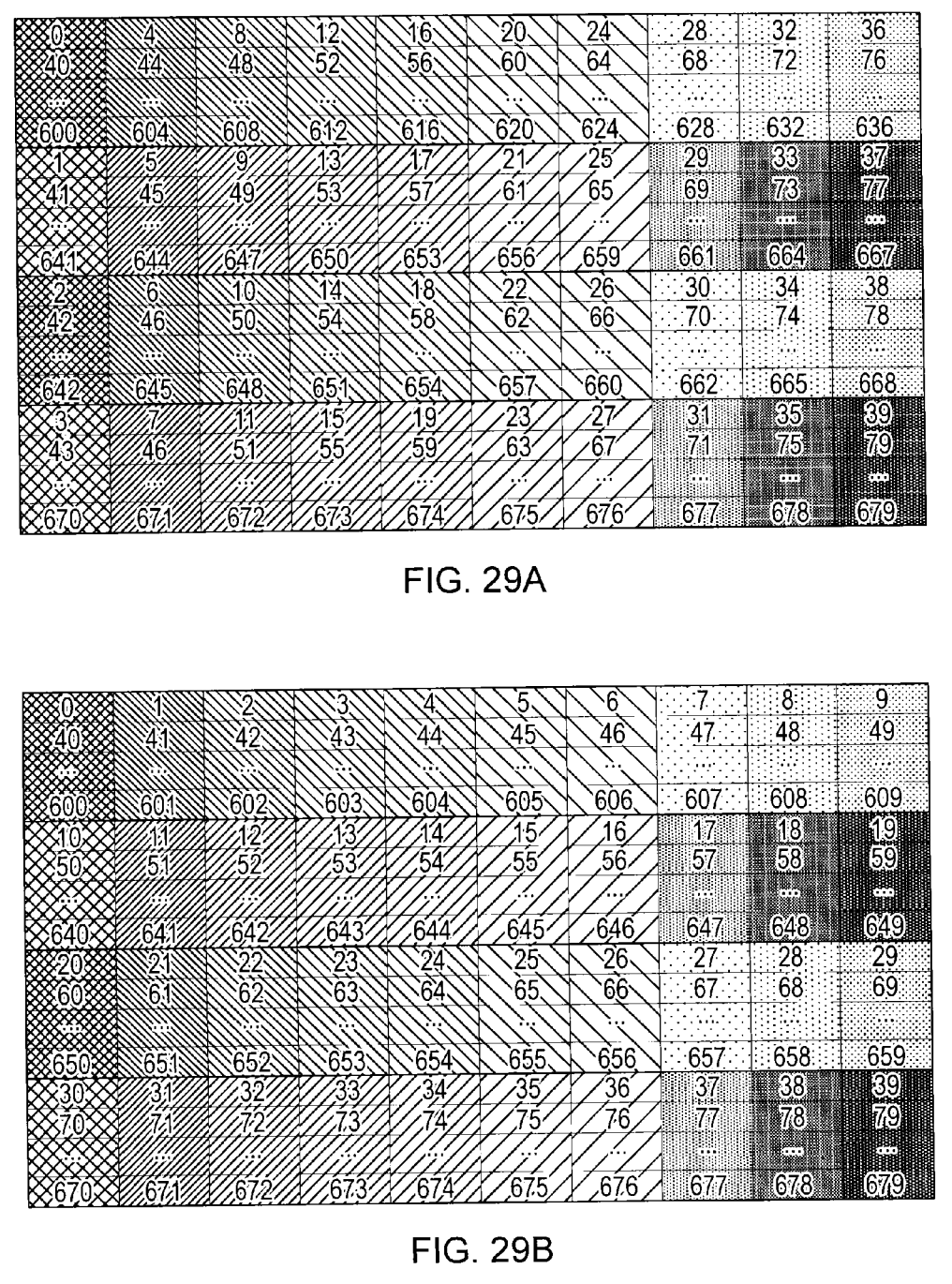

The ordering of the wavefronts could also be adjusted to account for the 4K video transport mode (for example 4K being produced using 4 columns of video, or 4 rows of video, or 4 quadrants of video). For example, the schemes shown in FIG. 29A and FIG. 29B could be used for the case of 4 rows of video, i.e. each source video link transports 4Kx540 lines of video. In FIGS. 29A and 29B each block represents a tile-wavefront segment and the number in each block indicates the order of the transmission of the data. One possible tile combination would be to have 10 columns of tiles and 4 rows of tiles, that being almost equivalent to 1 tile row per row of video.

It is important to note that in FIG. 29A and FIG. 29B, the tile rows are not equal in height, as there are 4 tile rows and yet only 68 CTU rows. In addition, because the video link heights are not divisible by 32 (the CTU height), row 34 will not contain the required start of the bottom half of the image—part of the bottom half is actually in row 33 (and similarly for the tile-rows 2 and 4). For this reason, the top row of tiles is only 16 CTU rows, the second and third row of tiles is 17 CTU rows and the bottom row of tiles is 18 CTU rows. Some small additional buffering will be required in the decoder to store the parts of the first CTU row of each tile and delay it for outputting at the end of the previous tile.

FIG. 29A schematically illustrates an adjusted sub-stream ordering for 4K when the 4K video data consists of 4 rows of 4Kx0.5K video, when using CTU-size of 32×32, wavefronts and tiles. There are 4 tile rows, and 10 tile columns. The adjusted ordering of the substream is indicated.

FIG. 29B schematically illustrates an alternative sub-stream ordering scheme for 4K when the 4K video data consists of 4 rows of 4Kx0.5K video, when using CTU-size of 32×32, wavefronts and tiles. There are 4 tile rows, and 10 tile columns. The adjusted ordering of the substream is indicated.

Such schemes may incur a frame delay at the encoder, since the second tile row cannot start to be encoded until the last row of the top source video link has been input.

It is therefore recommended that such formats are only used if the source video links can be made to be divisible by the CTU size. Padding is one mechanism that could be used. For example each 4096×540 video link is padded to 4096× 544 prior to coding. However, such padding would need to be understood by a compliant HEVC decoder if the bitstream were ever re-ordered, and video padding is not currently understood by the HEVC standard. A new type of SEI message could be created in order to pass this information to a decoder. Suitable information in this SEI message would describe the number of rows and columns of padding that have been added to each tile (and whether the padding has been added to the left or top or bottom or right edge of the tile, or a combination of all four).

Data Signals

It will be appreciated that data signals generated by the variants of coding apparatus discussed above, and storage or transmission media carrying such signals, are considered to represent embodiments of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique Further respective features of the present disclosure are defined by the following numbered clauses:

1. A video encoding method comprising:
   partitioning each image of a video signal into an array of coding tree units;
   partitioning the array of coding tree units of each image into a portion pattern of rectangular portions for independent encoding such that the prediction dependencies of samples within a portion do not extend into any other portion and the entropy encoding parameters of one portion are independent of those of any other portion, the portion pattern being such that each row of coding tree units is partitioned into at least two of the portions;
   encoding the coding tree units within each portion using wavefront parallel processing in which, for each portion, successive rows of coding tree units within the portion are encoded so that encoding dependencies are not broken at row boundaries and encoding parameters are propagated from an intermediate position along each row of the portion to the start of the next row of coding tree units; and
   outputting the encoded coding tree units according to an order with respect to the array of coding tree units which is different to a raster order of coding tree units within successive respective portions.

2. A method according to clause 1, in which the portions are tiles.

3. A method according to clause 1 or clause 2, in which the portions are slices containing more than 1 tiles, or more than 1 tile containing one or more slices.

4. A method according to any one of the preceding clauses, comprising the step of:
   associating dummy portion header data with the encoded coding tree units.

5. A method according to any one of the preceding clauses, comprising the step of:
   associating indicator data with each row of encoded coding tree units from each portion, the indicator data indicating the extent of the encoded data representing that row of encoded coding tree units from that portion.

6. A method according to any one of the preceding clauses, comprising the step of re-ordering the encoded coding tree units for storage, so that the coding tree units are stored in a portion-by-portion arrangement.

7. A method according to clause 6, comprising the step of:
   associating header data with the re-ordered encoded coding tree units, the header data indicating at least the location, within the re-ordered coding tree units for that portion, of each row of encoded coding tree units.

8. A method according to any one of the preceding clauses, in which the outputting step comprises outputting the encoded coding tree units according to a raster order of successive complete rows of the array of coding tree units.

9. A video decoding method for decoding coding tree units encoded according to the method of any one of the preceding clauses, the method comprising:
   decoding, in parallel with respect to at least two of the portions, the coding tree units within corresponding rows of each portion using wavefront parallel processing.

10. A method according to clause 9, in which the decoding step comprises decoding the coding tree units in parallel with respect to at least two of the portions in a row direction of the portion pattern.

11. Computer software which, when executed by a computer, causes the computer to perform the method of any one of the preceding clauses.

12. A non-transitory machine-readable storage medium which stores computer software according to clause 11.

13. Video encoding apparatus comprising:
a controller configured to partition each image of a video signal into an array of coding tree units and to partition the array of coding tree units of each image into a portion pattern of rectangular portions for independent encoding such that the prediction dependencies of samples within a portion do not extend into any other portion and the entropy encoding parameters of one portion are independent of those of any other portion, the portion pattern being such that each row of coding tree units is partitioned into at least two of the portions;
an encoder configured to encode the coding tree units within each portion using wavefront parallel processing in which, for each portion, successive rows of coding tree units within the portion are encoded so that encoding dependencies are not broken at row boundaries and encoding parameters are propagated from an intermediate position along each row to the start of the next row of coding tree units; and
a data output configured to output the encoded coding tree units according to an order with respect to the array of coding tree units which is different to a raster order of coding tree units within successive respective portions.

14. Video decoding apparatus for decoding coding tree units encoded by the apparatus of clause 13, the apparatus comprising:
a decoder configured to decode, in parallel with respect to at least two of the portions, the coding tree units within corresponding rows of each portion using wavefront parallel processing.

15. Video storage, retrieval, transmission, reception and/or display apparatus comprising video encoding apparatus according to clause 13.

The invention claimed is:

1. A video handling method comprising:
partitioning each image of a video signal into an array of coding tree units;
partitioning the array of coding tree units of each image into a portion pattern of rectangular portions for independent encoding such that prediction dependencies of samples within a rectangular portion, of the rectangular portions, do not extend into any other rectangular portion of the rectangular portions, and such that entropy encoding parameters of one rectangular portion, of the rectangular portions, are independent of those of any other rectangular portion of the rectangular portions, the portion pattern being such that each row of coding tree units is partitioned into at least two of the rectangular portions;
encoding the coding tree units within each rectangular portion using wavefront parallel processing in which, for each rectangular portion, successive rows of coding tree units within the rectangular portion are encoded so that encoding dependencies are not broken at row boundaries and encoding parameters are propagated from an intermediate position along each row of the rectangular portion to the start of the next row of coding tree units; and
outputting the encoded coding tree units according to an order with respect to the array of coding tree units which is different from a first raster order of coding tree units within successive respective rectangular portions.

2. The video handling method according to claim 1, wherein the rectangular portions are tiles.

3. The video handling method according to claim 1, wherein the rectangular portions are slices containing more than 1 tiles, or more than 1 tile containing one or more slices.

4. The video handling method according to claim 1, further comprising:
associating dummy portion header data with the encoded coding tree units.

5. The video handling method according to claim 1, further comprising:
associating indicator data with each row of encoded coding tree units from each rectangular portion, the indicator data indicating the extent of the encoded data representing that row of encoded coding tree units from that rectangular portion.

6. The video handling method according to claim 1, further comprising:
re-ordering the encoded coding tree units for storage, so that the coding tree units are stored in a portion-by-portion arrangement.

7. The video handling method according to claim 6, further comprising:
associating header data with the re-ordered encoded coding tree units, the header data indicating at least the location, within the re-ordered coding tree units for that rectangular portion, of each row of encoded coding tree units.

8. The video handling method according to claim 1, wherein said outputting includes outputting the encoded coding tree units according to a second raster order of successive complete rows of the array of coding tree units.

9. A video receipt handling method for decoding coding tree units encoded according to the video handling method of claim 1, the video receipt handling method comprising:
decoding, in parallel with respect to at least two of the rectangular portions, the coding tree units within corresponding rows of each rectangular portion using wavefront parallel processing.

10. The video receipt handling method according to claim 9, wherein said decoding includes decoding the coding tree units in parallel with respect to at least two of the rectangular portions in a row direction of the portion pattern.

11. The video handling method according to claim 1, wherein said outputting outputs the encoded coding tree units as streaming data.

12. A non-transitory computer readable medium including computer program instructions, which when executed by a computer causes the computer to perform the video handling method of claim 1.

13. A video handling apparatus comprising:
a controller configured to partition each image of a video signal into an array of coding tree units and to partition the array of coding tree units of each image into a portion pattern of rectangular portions for independent encoding such that prediction dependencies of samples within a rectangular portion, of the rectangular portions, do not extend into any other rectangular portion of the rectangular portions, and the such that entropy encoding parameters of one rectangular portion, of the rectangular portions, are independent of those of any other rectangular portion of the rectangular portions, the portion pattern being such that each row of coding tree units is partitioned into at least two of the rectangular portions;

an encoder configured to encode the coding tree units within each rectangular portion using wavefront parallel processing in which, for each rectangular portion, successive rows of coding tree units within the rectangular portion are encoded so that encoding dependencies are not broken at row boundaries and encoding parameters are propagated from an intermediate position along each row to the start of the next row of coding tree units; and a data output configured to output the encoded coding tree units according to an raster order with respect to the array of coding tree units which is different from a first raster order of coding tree units within successive respective portions.

14. A video receipt handling apparatus for decoding coding tree units encoded by the video handling apparatus of claim 13, the video receipt handling apparatus comprising:
a decoder configured to decode, in parallel with respect to at least two of the rectangular portions, the coding tree units within corresponding rows of each rectangular portion using wavefront parallel processing.

15. A video storage, retrieval, transmission, reception and/or display apparatus comprising the video handling apparatus of claim 13.

* * * * *